US012803965B2

(12) United States Patent
Kim

(10) Patent No.: US 12,803,965 B2
(45) Date of Patent: Nov. 17, 2026

(54) SYSTEM FOR CONTROLLING NETWORK ACCESS ON BASIS OF CONTROLLER, AND METHOD THEREFOR

(71) Applicant: PRIBIT AI Inc., Seoul (KR)

(72) Inventor: Young Rang Kim, Seoul (KR)

(73) Assignee: PRIBIT AI Inc., Seoul (KR)

( * ) Notice: Subject to any disclaimer, the term of this patent is extended or adjusted under 35 U.S.C. 154(b) by 159 days.

(21) Appl. No.: 18/710,143

(22) PCT Filed: Nov. 10, 2022

(86) PCT No.: PCT/KR2022/017607
§ 371 (c)(1),
(2) Date: May 14, 2024

(87) PCT Pub. No.: WO2023/085793
PCT Pub. Date: May 19, 2023

(65) Prior Publication Data

US 2025/0023857 A1 Jan. 16, 2025

(30) Foreign Application Priority Data

Nov. 15, 2021 (KR) ........................ 10-2021-0156541

(51) Int. Cl.
*H04L 9/00* (2022.01)
*H04L 9/40* (2022.01)
(Continued)

(52) U.S. Cl.
CPC ............ *H04L 63/08* (2013.01); *H04L 69/165* (2013.01); *H04L 69/22* (2013.01)

(58) Field of Classification Search
CPC ........ H04L 63/08; H04L 69/165; H04L 69/22
(Continued)

(56) References Cited

U.S. PATENT DOCUMENTS 8,543,620 B2 * 9/2013 Ching .................... G06Q 10/06
707/804
10,243,739 B1 * 3/2019 Brandwine ........... H04L 9/0643
(Continued)

FOREIGN PATENT DOCUMENTS

KR 10-2003-0092851 A 12/2003
KR 10-2017-0063280 A 8/2017
(Continued)

*Primary Examiner* — Bharat Barot
(74) *Attorney, Agent, or Firm* — Seed Intellectual Property Law Group LLP

(57) ABSTRACT

A node according to an embodiment disclosed in the present document can store instructions so as to: determine a communication protocol on the basis of whether an operating system transport layer can be accessed through an access control application; transmit, on the basis of the determined communication protocol, an authentication data packet including first authentication information stored in the access control application to an external server, and request authentication; receive an authentication result with respect to the authentication data packet from the external server; and change an authentication state of a control data packet on the basis of the received authentication result. If a control data processing request for the external server is performed, the control data processing request is performed on the basis of the control data packet having a changed authentication state.

20 Claims, 17 Drawing Sheets

(51) Int. Cl.
*H04L 69/165* (2022.01)
*H04L 69/22* (2022.01)

(58) Field of Classification Search
USPC .......................................................... 726/4–6
See application file for complete search history.

(56) References Cited

U.S. PATENT DOCUMENTS

| | | | | |
|---|---|---|---|---|
| 10,278,045 | B2 * | 4/2019 | Suzuki | H04L 63/08 |
| 12,248,824 | B2 * | 3/2025 | Lu | G06F 9/542 |
| 2005/0076206 | A1 * | 4/2005 | Javanainen | H04L 63/126 726/4 |
| 2009/0050697 | A1 * | 2/2009 | Sparks | G07C 9/257 235/382.5 |
| 2014/0169337 | A1 * | 6/2014 | Wang | H04W 76/16 370/335 |
| 2014/0196117 | A1 * | 7/2014 | Schwebke | H04L 63/08 726/4 |
| 2019/0140974 | A1 | 5/2019 | Sung et al. | |
| 2021/0091976 | A1 | 3/2021 | Kim et al. | |
| 2021/0092094 | A1 | 3/2021 | Kim et al. | |
| 2021/0092095 | A1 | 3/2021 | Kim et al. | |
| 2021/0328830 | A1 | 10/2021 | Kim et al. | |
| 2022/0247718 | A1 | 8/2022 | Kim et al. | |
| 2022/0247719 | A1 | 8/2022 | Kim et al. | |
| 2022/0247720 | A1 | 8/2022 | Kim et al. | |
| 2022/0247721 | A1 | 8/2022 | Kim et al. | |
| 2022/0247748 | A1 | 8/2022 | Kim | |
| 2022/0255906 | A1 | 8/2022 | Kim et al. | |
| 2022/0337604 | A1 | 10/2022 | Kim et al. | |

FOREIGN PATENT DOCUMENTS

| | | | |
|---|---|---|---|
| KR | 10-2019-0052749 | A | 5/2019 |
| KR | 10-2020-0021364 | A | 2/2020 |
| KR | 10-2223827 | B1 | 3/2021 |
| KR | 10-2460691 | B1 | 10/2022 |

* cited by examiner

SYSTEM FOR CONTROLLING NETWORK ACCESS ON BASIS OF CONTROLLER, AND METHOD THEREFOR

CROSS-REFERENCE TO RELATED APPLICATION(S)

The present disclosure claims the benefit of Korean Patent Application No. 10-2021-0156541 filed on Nov. 15, 2021 with the Korean Intellectual Property Office, the disclosure of which is incorporated herein by reference in its entirety.

BACKGROUND

Technical Field

Embodiments of the present disclosure relate to a system for controlling a network access based on a controller and a method thereof.

Description of the Related Art

A plurality of devices may communicate data over a network. For example, a smartphone may transmit or receive data to or from a server over the Internet. The network may include a private network such as an intranet as well as a public network such as the Internet.

BRIEF SUMMARY

Technical Problem

A technology for restricting the access to the network based on transmission control protocol (TCP)/Internet protocol (IP) is being applied to control the indiscriminate access to the network.

For example, when an authorized terminal is provided with an authorized IP address, a network access controller (NAC) allows the authorized terminal to access the network; when an unauthorized terminal uses an unauthorized IP address, the NAC blocks the unauthorized terminal by using address resolution protocol spoofing (ARP spoofing). A firewall refers to a method of determining whether to allow transmission of a data packet, based on a source IP, a destination IP, and port information, which are included in IP header information, and a policy. A virtual private network (VPN) refers to a method which guarantees the integrity and confidentiality of data packets by using a channel, to which encryption is applied, on the TCP/IP protocol.

However, the ARP spoofing may act as a load on the network. Recently, a technology for bypassing the ARP spoofing has been developed. Because the firewall is used to control the flow of data packets, the firewall may fail to directly involve the process of generating a connection between two nodes. Also, the VPN is vulnerable to management associated with the flow of data packets after the channel is generated. In addition, because the above technologies are based on the TCP/IP, the above technologies may be vulnerable to security associated with any other layer (e.g., an application layer) among open system interconnection (OSI) layers.

Also, because a controller which should control the access to all networks and a network node which should generate a channel are inevitably exposed to an untrusted network area, a denial of service (DoS) attack on the controller and the network may be performed; in this case, a vulnerable characteristic such as a network failure may be inherent therein.

In addition, when a terminal provides mobility or when a sub-network is implemented through a router, a structure in which an IP whose authentication is completed is registered and the transmission of data packets based on the registered IP is permitted may be possible. However, when the IP of the terminal is changed, the issue that communication is not permitted may occur. Also, when a terminal performing authentication in advance on the sub-network exists, the issue that any other terminals connected to the sub-network also are in a state of being accessible to the network may occur.

Various embodiments of the present disclosure provide a system for addressing the above-mentioned problems in a network environment and a method thereof.

Technical Solution

A node according to an embodiment of the present disclosure may include a communication circuit, a processor that is operatively connected to the communication circuit, and a memory that is operatively connected to the processor and stores a target application and an access control application. The memory may store instructions causing, when executed by the processor, the node to determine a communication protocol based on whether an access to an operating system transport layer through the access control application is possible, to transmit an authentication data packet including first authentication information stored in the access control application to an external server based on the determined communication protocol and to request authentication, to receive an authentication result of the authentication data packet from the external server, to change an authentication state of a control data packet based on the received authentication result, and to perform a control data processing request for the external server based on the control data packet whose authentication state is changed.

A server according to an embodiment of the present disclosure may include a filter, a communication circuit, a memory that stores a database, and a processor that is operatively connected to the filter, the communication circuit, and the memory. The filter may receive a control data packet from an access control application of a node, may identify a communication protocol through which the control data packet is received, may identify whether first authentication information is included in the control data packet, and may forward the control data packet to the processor or may drop the control data packet, based on the communication protocol and whether the first authentication information is included.

A network node may include a filter, a communication circuit, a memory that stores a database, and a processor that is operatively connected to the filter, the communication circuit, and the memory. The filter may receive a channel data packet from an access control application of a node, may identify a communication protocol through which the channel data packet is received, may identify whether channel generation authentication information is included in the channel data packet, and may forward the channel data packet to the processor or may drop the channel data packet, based on the communication protocol and whether the channel generation authentication information is included.

An operating method of an access control application installed in a node, according to an embodiment of the present disclosure, may include determining a communication protocol based on whether an access to an operating system transport layer through the access control application is possible, transmitting an authentication data packet including authentication information stored in the access control application to an external server based on the determined communication protocol and requesting authentication, receiving an authentication result of the authentication data packet from the external server, changing an authentication state of a control data packet based on the received authentication result, and performing a control data processing request for the external server based on the control data packet whose authentication state is updated.

Advantageous Effects

According to embodiments of the present disclosure, a node may block a data packet from being received from an unauthorized application.

Also, according to embodiments of the present disclosure, it is possible to solve the problem of setting and retrieving a policy and to prevent bypass attacks, compared to a wide range of IP address-based network security technologies such as an NAC.

Moreover, according to embodiments of the present disclosure, it is possible to block a man-in-the-middle (MITM) attack in a zero trust network environment, and thus, a channel-based access control may be performed compared to a VPN which provides only section protection.

In addition, according to embodiments of the present disclosure, it is possible to solve an issue inherent in a TCP/IP-based network security technology and to provide a safe network connection.

Besides, according to embodiments of the present disclosure, it is possible to solve an issue that there is a need to set a policy depending on network control equipment.

Also, according to embodiments of the present disclosure, it is possible to prevent the problem of attacking a network node by finding a key, which is used to generate and check an OTP between a node and a network node for authentication of data packets, through reverse engineering.

Moreover, according to embodiments of the present disclosure, all nodes may perform authentication when accessing a controller and generating a channel with a network node by making it possible to perform UDP-based authentication for a node incapable of accessing a transport layer of an operating system and performing TCP SYN packet-based authentication for a node capable of accessing the transport layer.

In addition, according to embodiments of the present disclosure, a controller and a network node may prevent an unauthenticated node from accessing the controller and a service of the network node by checking a data packet including a data packet authentication and protection header at a network level (e.g., a network filter present in each of the controller and a kernel of the network node) when receiving a data packet from the outside.

Besides, according to embodiments of the present disclosure, because an unauthenticated node is prevented from indiscriminately transmitting data packets at a service level of the network node and the controller, an unauthenticated data packet may be blocked from being transmitted at a service level, and because a service resource does not cope with (or respond to) an indiscriminate request, a network environment which is safe from a DoS attack may be established.

Furthermore, according to embodiments of the present disclosure, because a controller generates authentication information for generating a channel and transmits the authentication information to a node and performs authentication with a network node through the corresponding information, there may be solved a problem of attacking a network by using stolen authentication information.

Additionally, according to embodiments of the present disclosure, a DoS attack on a node may be prevented by monitoring identification information of a node which continuously fails in a controller access and registering a node satisfying a set condition at a blacklist.

In addition, various effects ascertained directly or indirectly through the present disclosure may be provided.

DETAILED DESCRIPTION

Figure 1:
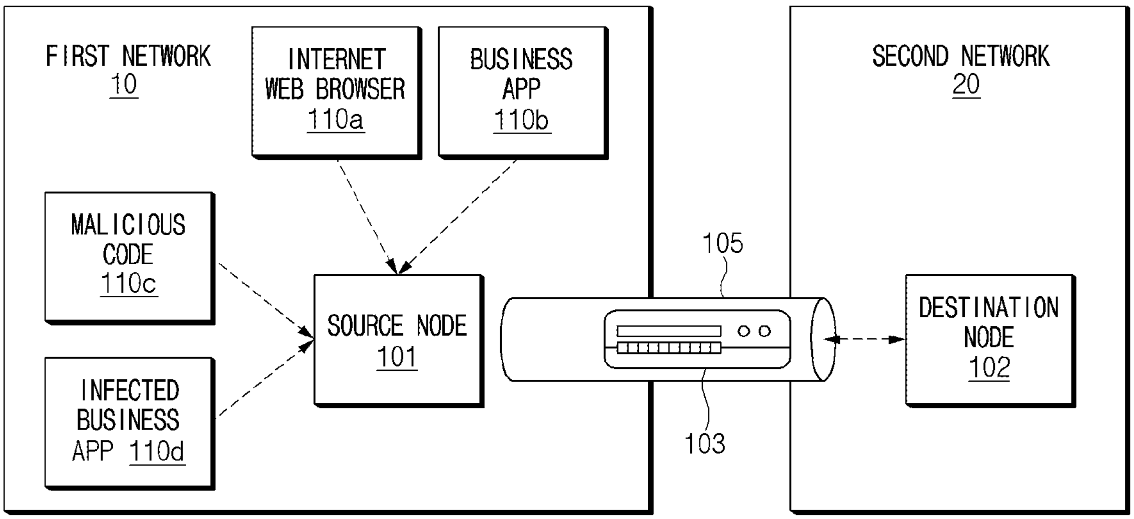
FIG. 1 illustrates an environment including a plurality of networks.

Hereinafter, various embodiments of the present disclosure will be described with reference to accompanying drawings. However, it should be understood that this is not intended to limit the present disclosure to specific implementation forms and includes various modifications, equivalents, and/or alternatives of embodiments of the present disclosure.

In the specification, the singular form of the noun corresponding to an item may include one or more of items, unless interpreted otherwise in context. In the specification, each of phrases such as “A or B”, “at least one of A and B”, “at least one of A or B”, “A, B, or C”, “at least one of A, B, and C”, and “at least one of A, B, or C” may include any one of items listed together with a relevant phase among the phases or all possible combinations thereof. The terms such as “first” or “second” may be used to simply distinguish the corresponding component from the other component but do not limit the corresponding components in other aspects (e.g., importance or order). When a component (e.g., a first component) is referred to as being “coupled to” or “connected to” another component (e.g., a second component) with or without the term of “operatively” or “communicatively”, it may mean that the first component is capable of being connected to the second component, directly (e.g., by wire), wirelessly, or through a third component.

Each component (e.g., a module or a program) of components described in the specification may include a single entity or a plurality of entities. According to various embodiments, one or more components of corresponding components or operations may be omitted, or one or more other components or operations may be added. Alternatively or additionally, a plurality of components (e.g., a module or a program) may be integrated into one component. In this case, the integrated component may perform one or more functions of each component of the plurality of components to be the same as or similar to those performed by the corresponding component of the plurality of components before the plurality of components are integrated. According to various embodiments, operations which are performed by modules, programs, or other components may be performed by a sequential, parallel, repeated, or heuristic method; alternatively, one or more of the operations may be performed in another order or may be omitted, or one or more operations may be added thereto.

As used in the present disclosure, the term “module” may include a unit implemented in hardware, software, or firmware and may be interchangeably used, for example, with terms such as “logic”, “logic block”, “part”, or “circuit”. The module may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented as software (e.g., a program or an application) including one or more instructions stored in a storage medium (e.g., a memory) readable by a machine. For example, a processor of the machine may call at least one instruction among the stored one or more instructions from the storage medium and then may execute the at least one instruction. This enables the machine to operate such that at least one function is executed depending on the called at least one instruction. The one or more instructions may include a code generated by a complier or a code executable by an interpreter. The machine-readable storage medium may be provided in the form of a non-transitory storage medium. Herein, the “non-transitory” only means that the storage medium is a tangible device and does not include a signal (e.g., an electromagnetic wave), and this term does not distinguish the case where data are semipermanently stored in the storage medium from the case where the data are stored temporarily.

A method according to various embodiments disclosed in the specification may be provided to be included in a computer program product. The computer program product may be traded between a seller and a buyer as a product. The computer program product may be distributed in the form of a machine-readable storage medium (e.g., a compact disc read only memory (CD-ROM)) or may be distributed (e.g., downloaded or uploaded), through an application store, directly between two user devices, or online. If distributed online, at least a part of the computer program product may be temporarily generated or may be at least temporarily stored in the machine-readable storage medium such as a memory of the manufacturer’s server, a server of the application store, or a relay server.

FIG. 1 illustrates an environment including a plurality of networks.

Referring to FIG. 1, a first network 10 and a second network 20 may be different networks. For example, the first network 10 may be a public network such as the Internet, and the second network 20 may be a private network such as an intranet or a virtual private network (VPN).

The first network 10 may include a source node 101. In FIG. 1 and embodiments to be described below, the “source node” may be various types of devices capable of performing data communication. For example, the source node 101 may include a portable device such as a smartphone and a tablet, a computer device such as a desktop or a laptop, a multimedia device, a medical device, a camera, a wearable device, a virtual reality (VR) device, or a home appliance but are not limited to the above devices. For example, the source node 101 may include a server or a gateway capable of transmitting a data packet through an application. The source node 101 may be also referred to as an “electronic device” or a “terminal”. Meanwhile, a destination node 102 may include a device which is the same as or similar to the source node 101 described above. For another example, the destination node 102 may be substantially the same as a destination network.

The source node 101 may attempt to access the second network 20 and may transmit data to the destination node 102 included in the second network 20. The source node 101 may transmit data to the destination node 102 through a network node 103 and a channel 105.

When the access of the source node 101 to the first network 10 is granted, the source node 101 may be able to communicate with all servers included in the first network 10; in this case, the source node 101 may be exposed from an attack of a malicious program. For example, the source node 101 may receive a malicious code 110*c* or data of an untrusted or insecure application such as an infected business application 110*d*, as well as an Internet web browser 110*a* and a trusted and/or secure application such as a business application 110*b*.

The source node 101 infected from the malicious program may attempt to access the second network 20 and/or to transmit data to the second network 20. When the second network 20 is established based on an IP like the VPN, it may be difficult for the second network 20 to individually monitor a plurality of devices included in the second network 20, and the second network 20 may be vulnerable to security of an application layer or a transport layer in an OSI layer. Also, when the source node 101 includes a malicious application after the channel is already generated, data of the malicious application may be transmitted to another electronic device (e.g., the destination node 102) in the second network 20.

Figure 2:
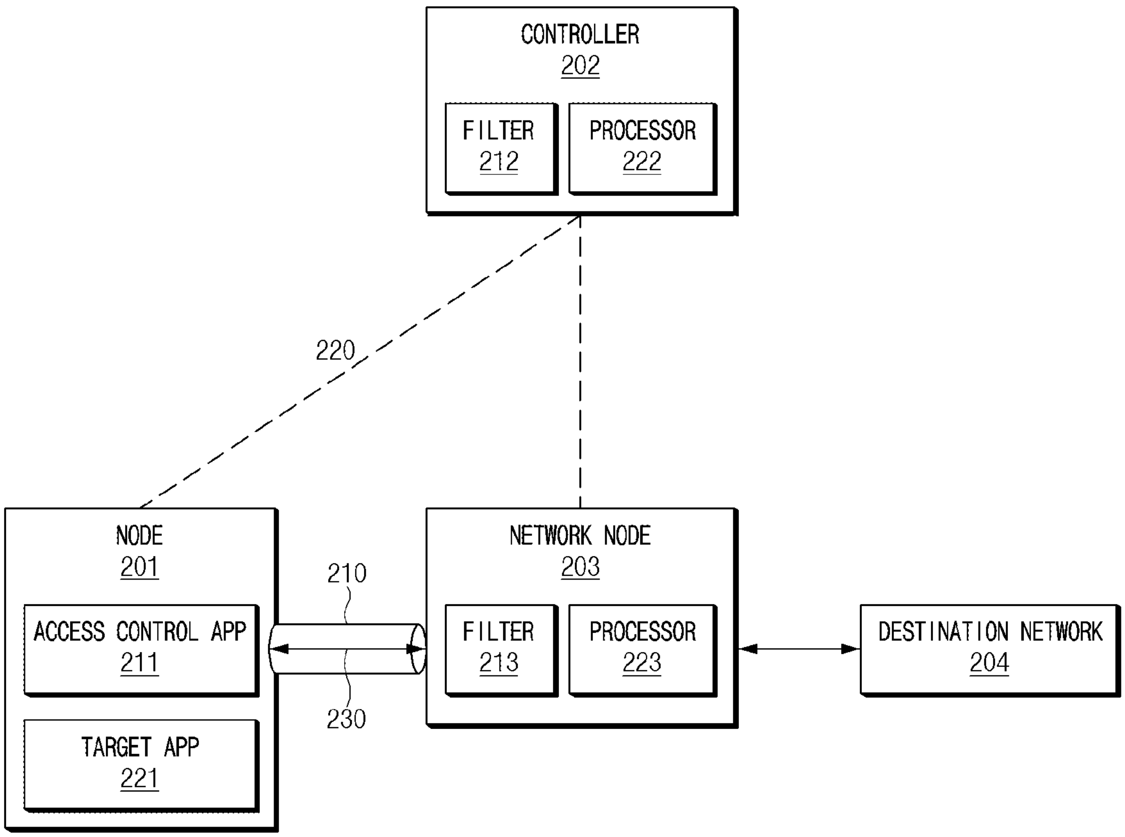
FIG. 2 illustrates an architecture in a network environment, according to various embodiments.

FIG. 2 illustrates an architecture in a network environment according to various embodiments.

Referring to FIG. 2, the number of nodes 201, the number of network nodes 203, and the number of destination networks 204 are not limited to examples illustrated in FIG. 2. For example, the node 201 may transmit data to a plurality of destination networks through a plurality of network nodes, and a controller 202 may manage a plurality of nodes, a plurality of network nodes, and a plurality of destination networks. The node 201 may perform a function the same as or similar to the source node 101 illustrated in FIG. 1, the network node 103 may perform a function the same as or similar to the network node 103 illustrated in FIG. 1, and the destination node 204 may perform a function the same as or similar to the destination node 102 illustrated in FIG. 1.

For example, the controller 202 may be a server (or a cloud server). The controller 202 may ensure trusted data transmission in the network environment by managing data transmission between the node 201, the network node 203, and the destination network 204. For example, the controller 202 may manage the access of the node 201 to the destination network 204 through policy information or blacklist information, may arbitrate the generation of an authorized channel 210 between the node 201 and the network node 203, or may remove the channel 210 depending on a security event collected from the node 201 or the network node 203. The node 201 may communicate with the destination network 204 only through the channel 210 authorized by the controller 202; when the authorized channel 210 does not exist, the access of the node 201 to the destination network 204 may be blocked. According to an embodiment, the controller 202 may transmit/receive control data packets to/from the node 201 to perform various operations (e.g., registration, approval, authentication, update, and termination) associated with the network access of the node 201. A flow (e.g., 220) through which the control data packet is transmitted may be referred to as a "control flow". According to an embodiment, the controller 202 may include a filter 212 and a processor 222. The filter 212 may block an unauthenticated data packet from being transmitted to the processor 222 of a service level by authenticating (or checking) a data packet received from the node 201 at a network level, drop-processing a data packet whose authentication (or check) fails, and forwarding only a data packet whose authentication is successful to the processor 222 of the service level.

The network node 203 may be located at the boundary of a network to which the node 201 belongs or at the boundary of a network to which the destination network 204 belongs. The network node 203 may be provided in plurality. The network node 203 may forward only a data packet, which is received through the authorized channel 210, from among data packets received from the node 201 to the destination network 204. A flow (e.g., 230) through which a data packet is transmitted between the node 201 and the network node 203, between the network node 203 and the destination network 204, or between the node 201 and the destination network 204 may be referred to as a "data flow". Compared to the channel 210 generated in units of terminal or IP, the data flow may be generated in a more detailed unit (e.g., an application). According to an embodiment, the network node 203 may be connected to the controller 202 based on a cloud. The network node 203 may generate the node 210 and the authorized channel 210 under control of the controller 202. According to an embodiment, the network node 203 may include a filter 213 and a processor 223. The filter 213 may block an unauthenticated data packet from being transmitted to the processor 223 of a service level by authenticating (or checking) a data packet received from the node 201 at a network level, drop-processing a data packet whose authentication (or check) fails, and forwarding only a data packet whose authentication is successful to the processor 223 of the service level.

According to various embodiments, the node 201 may include a network driver (not illustrated) and an access control application 211 for managing the network access of an application stored in the node 201. For example, when the event that a target application 221 (e.g., an arbitrary one of the applications 110*a* to 110*d* of FIG. 1) included in the node 201 accesses the destination network 204 occurs, the access control application 211 may determine whether the access of the target application 221 is possible. When the access of the target application 221 is possible, the access control application 211 may transmit a data packet to the network node 203 through the channel 210. The access control application 211 may control the transmission of the data packet through a kernel including an operating system in the node 201 and a network driver.

Figure 3:
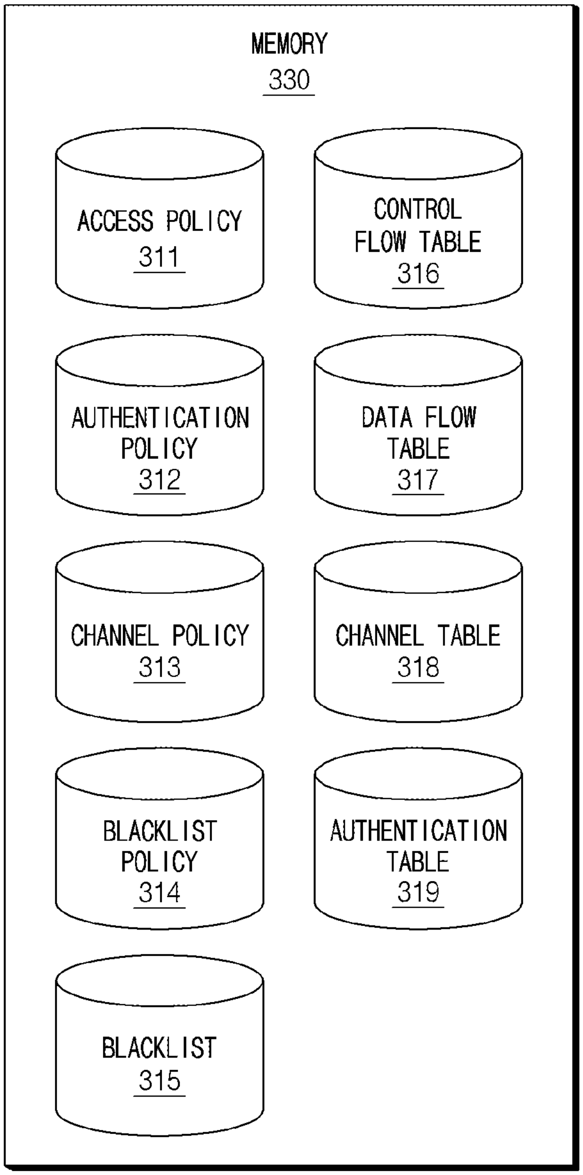
FIG. 3 is a functional block diagram illustrating a database stored in a controller, according to various embodiments.

FIG. 3 is a functional block diagram illustrating a database stored in a controller (e.g., the controller 202 of FIG. 2) according to various embodiments. FIG. 3 shows only a memory 330. However, a controller may further include a communication circuit (e.g., a communication circuit 430 of FIG. 4) for communicating with an external electronic device (e.g., the node 201 or the network node 203 of FIG. 2) and a processor (e.g., a processor 410 of FIG. 4) for controlling all the operations of the controller.

Referring to FIG. 3, the controller may store databases 311 to 319 for the control of network access and data transmission in the memory 330.

The access policy database 311 may include information about a network and/or a service accessible by an identified network, a node, a user, a non-identification user (or guest), or an application. For example, when a request for the access to the destination network is received from the node, the controller may determine whether the identified network (e.g., a network to which the node belongs), the node, the user (e.g., a user of the node), and/or the application (e.g., an application included in the node) is capable of accessing the destination network, based on the access policy database 311.

The authentication policy database 312 may include authentication information for authenticating each of a control data packet and a channel data packet depending on a version of an access control application installed in the node, a control flow processing method, and a kind of a channel to be generated with a network node. For example, the authentication information may include an OTP generation and check algorithm and KEY generation information. The node, the controller, and the network node may always perform safe data packet authentication based on the authentication information.

The channel policy database 313 may include an encryption method, encryption level information, and a type of a channel connected to the network node present at the boundary between the node (e.g., a terminal) and the network on a connection path. For example, when the access to the destination network is requested from the node, the controller may provide the node with an optimal channel for accessing the destination network and information of the optimal channel based on the channel policy database 313.

The blacklist policy database 314 may include a policy for permanently or temporarily blocking the access of a specific node. The blacklist policy database 314 may be generated based on information (e.g., at least one of a node identifier (ID), an IP address, a media access control (MAC) address, or a user ID) identified through a risk level, an occurrence period, and/or a behavioral analysis of a security event among security events periodically collected from the node or the network node.

The blacklist database 315 may include a list of at least one of a node, an IP address, a MAC address, or a user blocked by the blacklist policy database 314. For example, when identification information of the node requesting the access to the destination network is included in the blacklist database 315, the controller may isolate the node from the destination network by denying the access request of the node.

The control flow table 316 is provided as an example of a session table for managing a flow (e.g., a control flow) of a control data packet generated between the node and the controller. When the access to the controller is successfully made, control flow information may be generated by the controller. The control flow information may include at least one of identification information of the control flow, an IP address identified when an access and authentication associated with the controller is performed, a node ID, or a user ID. For example, when the access to the destination network is requested from the node, the controller may determine whether the access of the node is possible and whether to generate a channel by searching for the control flow information through control flow identification information received from the node and mapping at least one of an IP address, a source node ID, or a user ID included in the found control flow information to the access policy database 311.

According to an embodiment, the control flow may include an expiration time. The node should update the expiration time of the control flow, and when the expiration time is not updated during a given time, the control flow (or control flow information) may be removed. Also, when it is determined that there is a need to immediately block the access depending on the security event collected from the node or the network node, the controller may remove the control flow depending on an access end request of the node. When the control flow is removed, the channel and the data flow, which are previously generated, are also removed, and thus, the access of the node may be blocked.

The data flow table 317 refers to a table for managing a flow (e.g., a data flow) through which a detailed data packet is transmitted between the node and the network node or the destination network. The data flow may be generated in units of TCP session, in units of application of a node, or in a more detailed unit within the channel generated in units of node or IP. The data flow table 317 may include data flow identification information, control flow identification information when the data flow is dependent on the control flow, an application ID for determining whether a data packet transmitted from the node is an authorized data packet, a destination IP address, and/or a service port. Also, the data flow table 317 may include identification information of the channel in which the data flow is to be used. In addition, the data flow table 317 may include a header (or header information) for determining whether a data packet is valid. Furthermore, the data flow table 317 may further include whether a data flow header being authentication information is inserted into a data packet, a method of inserting a header, whether there is a need to authenticate a data flow, an authentication state of a data flow, and/or an authentication expiration time.

A channel table 318 refers to a table for managing a channel connected between the node and the network node. The channel may be generated, for example, in units of device or IP. When the channel is established between the node and the network node, the channel table 318 may include channel identification information, control flow identification information when the channel is dependent on a control flow, a channel algorithm, a channel kind, and/or additional information for managing the channel. According to an embodiment, the channel may include a tunnel and a security session.

An authentication table 319 may include a series of algorithm (e.g., an OTP) and key information for generating and checking authentication information between the node and the controller or the network node. Also, the authentication table 319 may include authentication target controller and target network node information, and IP information of the node to be authorized when corresponding authentication is performed including channel information. For example, when the IP of the node is included in the authentication table 319, the controller or the network node may determine that the authentication of the corresponding node is already completed.

Figure 4:
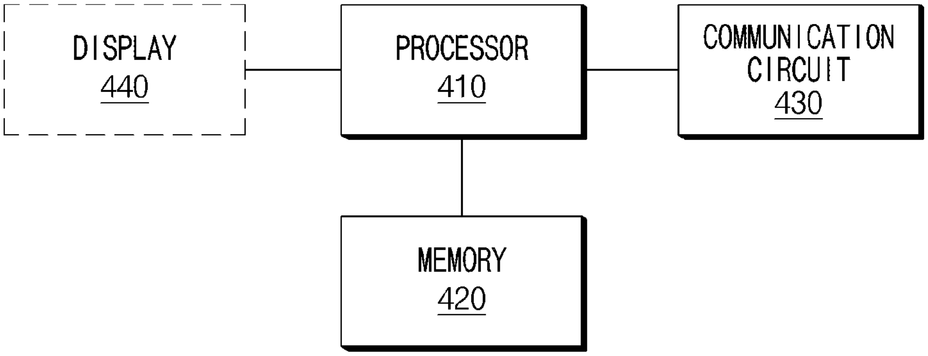
FIG. 4 illustrates a functional block diagram of a node, according to various with embodiments.

FIG. 4 is a functional block diagram of a node (e.g., the node 201 of FIG. 2) according to various embodiments.

Referring to FIG. 4, the node may include the processor 410, a memory 420, and the communication circuit 430. According to an embodiment, the node may further include a display 440 for performing an interface with a user.

The processor 410 may control all the operations of the node. In various embodiments, the processor 410 may include a single processor core or may include a plurality of processor cores. For example, the processor 410 may include a multi-core such as a dual-core, a quad-core, a hexa-core, or the like. According to embodiments, the processor 410 may further include a cache memory located at the inside or outside thereof. According to embodiments, the processor 410 may be configured with one or more processors. For example, the processor 410 may include at least one of an application processor, a communication processor, or a graphical processing unit (GPU).

Part or all of the processor 410 may be electrically or operatively coupled with or connected to any other component (e.g., the memory 420, the communication circuit 430, or the display 440) in the node. The processor 410 may receive commands of any other components of the node, may interpret the received commands, and may perform calculation or data processing depending on the interpreted commands. The processor 410 may interpret and process a message, data, an instruction, or a signal received from the memory 420, the communication circuit 430, or the display 440. The processor 410 may generate a new message, data, instruction, or signal based on the received message, data, instruction, or signal. The processor 410 may provide the processed or generated message, data, instruction, or signal to the memory 420, the communication circuit 430, or the display 440.

The processor 410 may process data or a signal which is generated or caused by a program. For example, the processor 410 may request an instruction, data, or a signal from the memory 420 to execute or control the program. The processor 410 may record (or store) or update an instruction, data, or a signal at the memory 420 to execute or control the program.

The memory 420 may store an instruction to control the node, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multimedia card (eMMC), or universal flash storage (UFS).

According to an embodiment, the memory 420 may store a portion of information included in a memory (e.g., the memory 330 of FIG. 3) of the controller. For example, the memory 420 may store the data flow table 317, the channel table 318, and the authentication table 319 which are described with reference to FIG. 3.

The communication circuit 430 may establish a wired or wireless communication connection between the node and an external electronic device (e.g., the controller 202 or the network node of FIG. 2) and may support to perform communication through the established communication connection. According to an embodiment, the communication circuit 430 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit or a power line communication circuit) and may communicate with the external electronic device by using a corresponding communication circuit among them through the short-range communication network such as a Bluetooth, a Wi-Fi direct, or an infrared data association (IrDA)) or the long-distance communication network such as a cellular network, an Internet, or a computer network. Various communication circuits 430 described above may be implemented with one chip or may be respectively implemented with separate chips.

The display 440 may output content, data, or a signal. In various embodiments, the display 440 may display image data processed by the processor 410. According to embodiments, the display 440 may be coupled with a plurality of touch sensors (not illustrated) capable of receiving a touch input or the like so as to be configured with an integrated touch screen. When the display 440 is configured with the touch screen, the plurality of touch sensors may be disposed over the display 440 or may be disposed under the display 440.

Meanwhile, a server (e.g., a controller) according to an embodiment may include the processor 410, the memory 420, and the communication circuit 430. The processor 410, the memory 420, and the communication circuit 430 included in the server may be substantially the same as the processor 410, the memory 420, and the communication circuit 430 which are described above.

Figure 5:
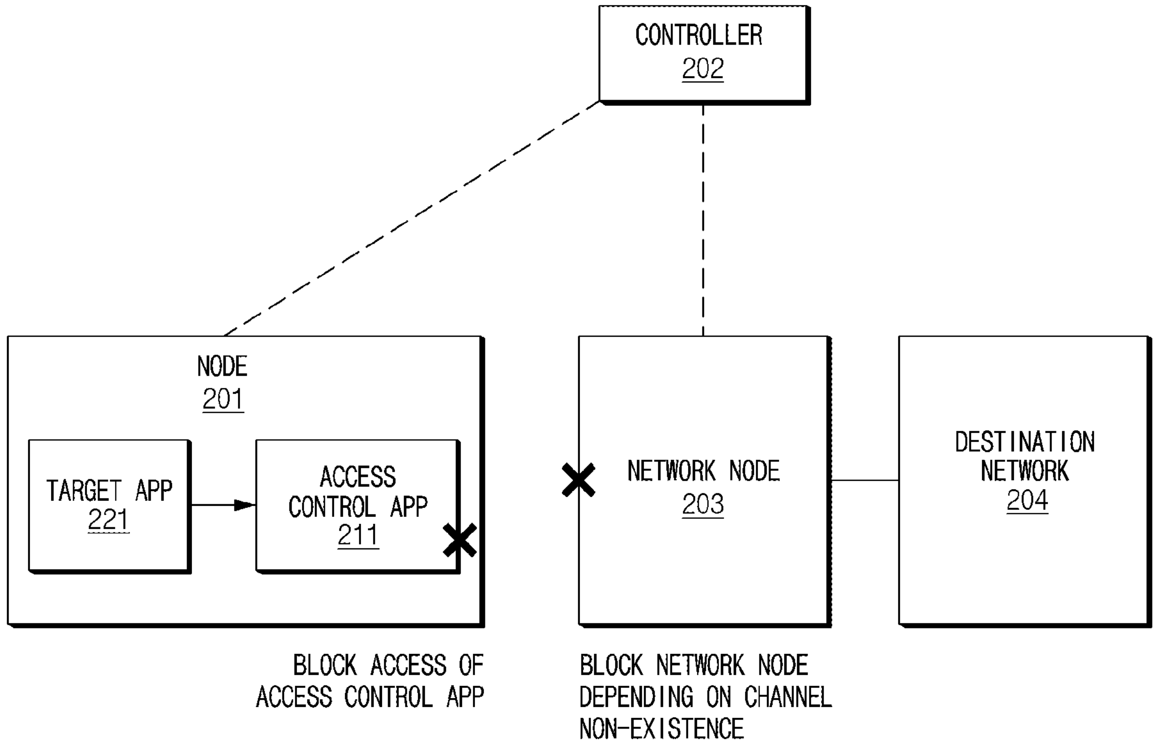
FIG. 5 describes an operation of controlling transmission of a data packet, according to various embodiments.

FIG. 5 describes an operation of controlling transmission of a data packet, according to various embodiments.

Referring to FIG. 5, the access control application 211 may detect a network transmission request of the target application 221 of the node 201 and may determine whether the node 201 or the access control application 211 connects to the controller 202. When the node 201 or the access control application 211 does not connect to the controller 202, the access control application 211 may block the transmission of a data packet by a kernel including an operating system or a network driver.

Also, even though the target application 221 of the node 201 bypasses the access control application 211 to transmit the data packet, when the data packet is not received through a channel authorized by the controller 202, the network node 203 may drop the data packet. That is, when a channel does not exist between the node 201 and the network node 203, the network node 203 may block a data packet received from the target application 221 of the node 201.

Figure 6:
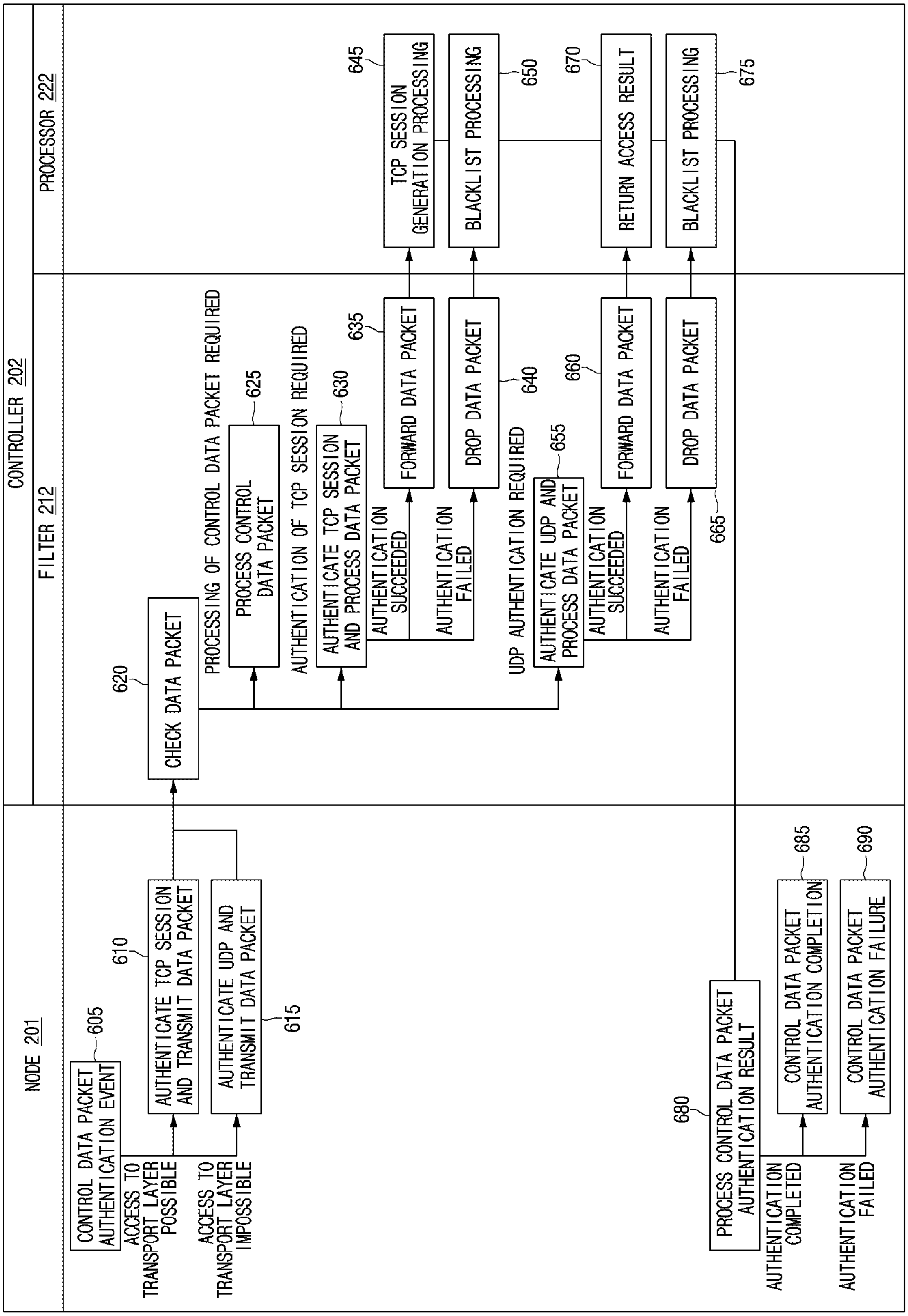
FIG. 6 illustrates a signal flow diagram for authenticating a control data packet of a source node, according to various embodiments.

FIG. 6 illustrates a signal flow diagram for authenticating a control data packet of a source node, according to various embodiments.

The node 201 may perform authentication for a data packet (e.g., a control data packet) with the filter 212 of the controller 202; when the authentication is failed, the data packet may be dropped by the filter 212 such that the data packet is not transmitted to the processor 222 controlling the service of the controller 202.

Referring to FIG. 6, in operation 605, the access control application 211 of the node 201 may detect a control data packet authentication event. For example, when the access control application 211 communicates with the controller 202 (e.g., control flow generation, update, a network access, or the like), the access control application 211 of the node 201 may transmit the control data packet to the controller 202. In this case, when the control data packet is determined as before being authenticated, the access control application 211 may perform an operation for authenticating the control data packet.

The access control application 211 may determine a communication protocol based on whether the access to an operating system transport layer is possible. For example, the communication protocol may include a TCP protocol or an UDP protocol. According to an embodiment, when the access of the node 201 to the operating system transport layer is possible, the access control application 211 may request a TCP protocol-based access from the controller 202. In this case, the access control application 211 may insert and transmit authentication information stored in the access control application 211 into a payload of a TCP SYN packet to be transmitted to the controller 202 (operation 610). For example, the authentication information stored in the access control application 211 may include OTP information generated by using the OTP generation algorithm and KEY information. In another embodiment, when the access of the node 201 to the operating system transport layer is impossible, the access control application 211 may request an UDP protocol-based access from the controller 202. In this case, the access control application 211 may generate a data packet based on the OTP information generated by using the OTP generation algorithm and KEY information included in the access control application 211 and may transmit the data packet to the controller 202 based on the UDP protocol (operation 615).

In operation 620, the filter 212 of the controller 202 may check the data packet (e.g., authentication data packet) received from the access control application 211. For example, the filter 212 may check the data packet based on a kind of a communication protocol through which the data packet is received and whether authentication information is included in the data packet.

In an embodiment, when the communication protocol of the received data packet is the TCP protocol and the data packet is not the TCP SYN packet, the filter 212 may perform processing of a control data packet (operation 625). For example, operation 625 may be performed by performing operation 740 to operation 755 illustrated in FIG. 7. For another example, when operation 625 is performed, operation 630 to operation 690 may not be performed.

In an embodiment, when the communication protocol of the received data packet is the TCP protocol and the data packet is the TCP SYN packet, the filter 212 may identify whether the authentication information is included in the data packet. For example, when the authentication information is included in the data packet, the filter 212 may process the data packet (e.g., authentication data packet) by checking the authentication information (operation 630). For example, whether authentication information generated based on the OTP check algorithm and KEY included in the filter 212 and the authentication information included in the data packet are matched may be compared. When the pieces of authentication information are matched, the filter 212 may add identification information of the node 201 to an authentication table (e.g., the authentication table 319 of FIG. 3) and may forward the data packet to the processor 222 (operation 635). When the data packet is forwarded, the processor 222 may receive a data packet for TCP session generation from the node 201, may provide a response to the node 201, and may generate the TCP session with the node 201 (operation 645). For another example, when the pieces of authentication information are not matched, the filter 212 may drop the data packet (operation 640). When the data packet is dropped, the filter 212 may store a data packet drop log for each identification information of the node 201 and may transmit the stored data packet drop log to the processor 222. The processor 222 may perform blacklist processing for the node 201 (e.g., may update a blacklist such that the node 201 is included therein), based on the data packet drop log of the node 201 and a database (operation 650). According to an embodiment, when the data packet is the SYN packet but the authentication information is not included, operation 625 may be performed.

In an embodiment, when the communication protocol of the received data packet is the UDP protocol and the authentication information is included in the data packet, the filter 212 may process the data packet (e.g., authentication data packet) by checking the authentication information (operation 655). For example, the filter 212 may compare whether the authentication information generated based on the OTP check algorithm and KEY included in the filter 212 is matched with the authentication information included in the data packet. When the pieces of authentication information are matched, the filter 212 may add the identification information of the node 201 to an authentication table (e.g., the authentication table 319 of FIG. 3) and may forward the data packet to the processor 222 (operation 660). When the data packet is forwarded, the processor 222 may return an access result and may transmit an authentication-completed data packet to the node 201 (operation 670). For another example, when the pieces of authentication information are not matched, the filter 212 may drop the data packet (operation 665). When the data packet is dropped, the filter 212 may store a data packet drop log for each identification information of the node 201 and may transmit the stored data packet drop log to the processor 222. The processor 222 may perform blacklist processing for the node 201 (e.g., may update a blacklist such that the node 201 is included therein), based on the data packet drop log of the node 201 and a database (operation 675).

In an embodiment, when the communication protocol of the received data packet is the UDP protocol and the authentication information is not included in the data packet, the filter 212 may drop the data packet.

The access control application 211 of the node 201 may receive an authentication result of the control data packet from the controller 202 and may process the authentication result (operation 680). For example, when an authentication success result is received (e.g., when the generation of the TCP session is completed and the authentication-completed data packet is received), the access control application 211 may change an authentication state of the control data packet to "success (e.g., completion)". For another example, when an authentication failure result is received (e.g., when the data packet is dropped), the access control application 211 may set the authentication state of the control data packet to "failure (e.g., non-completion)". In this case, the access control application 211 may retry authentication for the control data packet.

According to an embodiment, when the access control application 211 performs a control data processing request for the controller 202, the access control application 211 may allow the authentication state to be based on the changed control data packet.

According to an embodiment, in operation 620, the filter 212 may further identify whether the identification information of the node 201 is included in a blacklist (e.g., the blacklist 315 of FIG. 3), based on 5 Tuple information of the received data packet. For example, when the identification information of the node 201 is included in the blacklist, the filter 212 may drop the data packet and may not perform operation 625 to operation 675.

According to an embodiment, in operation 620, the filter 212 may further identify whether a port through which the data packet is received is a port being used for reception in the controller 202. For example, when the port through which the data packet is received is not a port being used for reception in the controller 202, the filter 212 may drop the received data packet.

Figure 7:
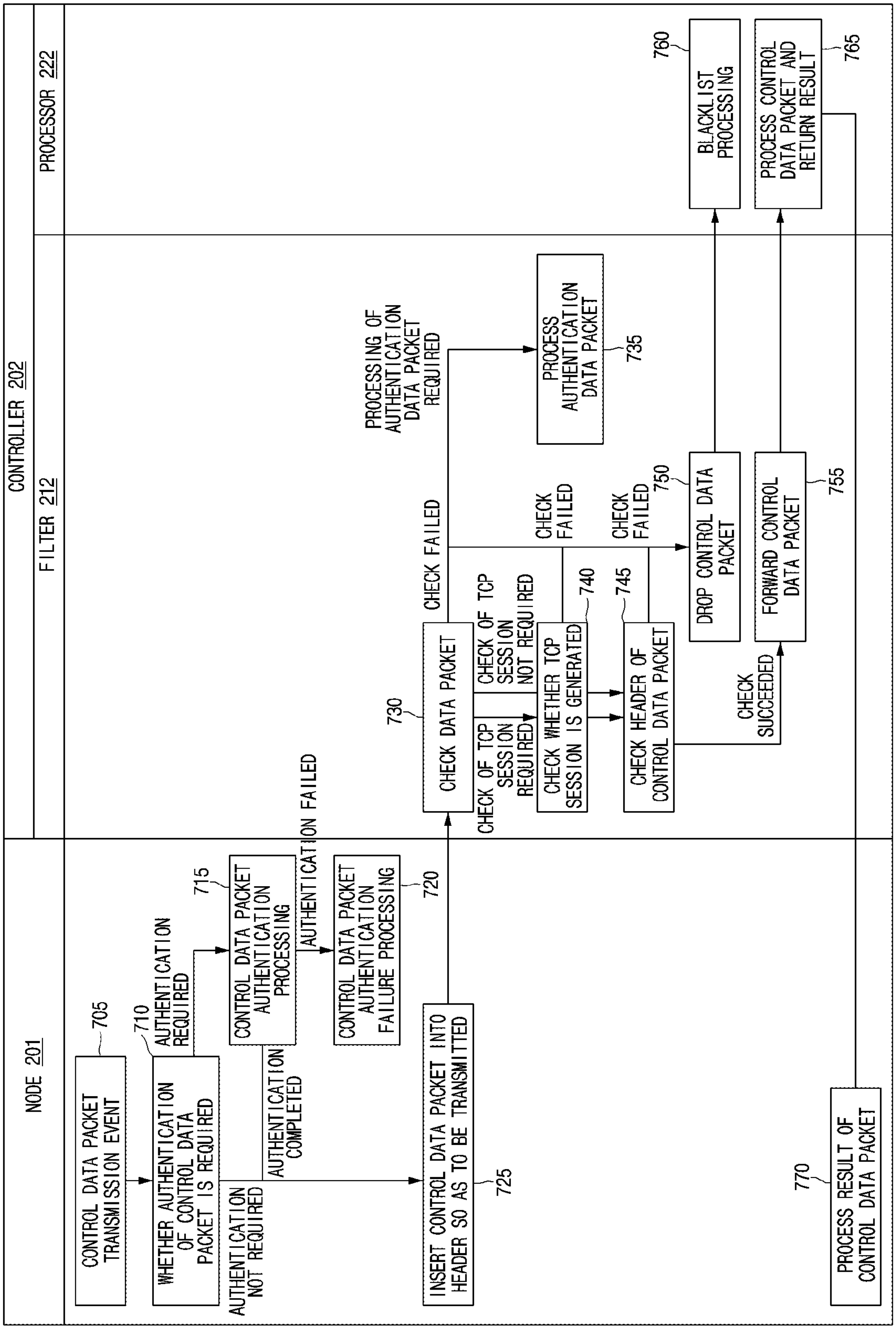
FIG. 7 illustrates a signal flow diagram for processing a control data packet, according to various embodiments.

FIG. 7 illustrates a signal flow diagram for processing a control data packet, according to various embodiments.

For the node 201 to communicate with the controller 202 (e.g., to perform control flow generation, update, or termination, a network access, or the like with the controller 202), there may be a need to transmit a control data packet so as to be processed from the controller 202. Accordingly, the access control application 211 of the node 201 may request processing of the control data packet by transmitting the control data packet to the controller 202.

Referring to FIG. 7, in operation 705, the access control application 211 of the node 201 may detect a control data packet transmission event. For example, the access control application 211 may detect the control data packet transmission event for requesting the control flow generation, update, or termination or the network access from the controller 202.

In operation 710, the access control application 211 may identify whether the authentication of the control data packet is required. For example, the access control application 211 may identify whether the authentication of the control data packet is required, by identifying an authentication state of the control data packet. According to an embodiment, when it is identified that the authentication of the control data packet is required, the access control application 211 may perform control data packet authentication processing (operation 715). Operation 715 may be performed by the operations illustrated in FIG. 6. When the authentication is successful, the access control application 211 may perform operation 725; when the authentication is failed, in operation 720, the access control application 211 may process the authentication for the control data packet as failure.

In operation 725, the access control application 211 may insert a control data packet header and may transmit the header-inserted control data packet to the controller 202. For example, in the control flow generation request (e.g., a controller access request), the access control application 211 may insert the following into the front of the payload of the control data packet: control flow identification information as initialization information for identifying the control flow generation request and OTP information (e.g., authentication information) generated by using the OTP generation algorithm and key information included in the access control application 211 as protection information. For another example, when the access control application 211 performs any other control-related request after the control flow is generated, the access control application 211 may insert the following into the front of the payload of the control data packet: control flow identification information received from the controller 202 and the OTP information (e.g., authentication information) generated by using the OTP generation algorithm and KEY information received from the controller 202 as protection information.

When the filter 212 of the controller 202 receives the control data packet from the node 201, in operation 730, the filter 212 may check the control data packet. For example, the filter 212 may check the control data packet based on a kind of the communication protocol of the received control data packet and whether authentication information is included in the received control data packet.

In an embodiment, when the control data packet is received through the UDP protocol, the filter 212 may perform authentication data packet processing based on the received control data packet (operation 735). For example, operation 735 may be performed through the operations illustrated in FIG. 6.

In an embodiment, when the control data packet is received through the TCP protocol, the control data packet is the TCP SYN packet, and authentication information is present in the payload of the control data packet, the filter 212 may perform authentication data packet processing based on the received control data packet (operation 735). For example, operation 735 may be performed through the operations illustrated in FIG. 6.

In an embodiment, when the control data packet is received through the TCP protocol, the control data packet is the TCP SYN packet, and authentication information is absent from the payload of the control data packet, the filter 212 may identify whether the identification information of the node 201 is present in an authentication table (e.g., the authentication table 319 of FIG. 3) (operation 740). When the identification information of the node 201 is absent from the authentication table, the filter 212 may drop the control data packet (operation 750); when the identification information of the node 201 is present in the authentication table, the filter 212 may perform operation 745.

In an embodiment, when the control data packet is received through the TCP protocol and the control data packet is not the TCP SYN packet, the filter 212 may perform operation 745.

In operation 745, the filter 212 may check the header of the control data packet. For example, when the header of the control data packet does not exist, the filter 212 may drop the control data packet (operation 750).

In an embodiment, when the header of the control data packet exists, the filter 212 may identify control flow identification information included in the control data packet and may identify whether the control flow identification information included in the control data packet is in an initialization state (e.g., before the generation of the control flow). When the control flow identification information included in the control data packet is in an initialization state, the filter 212 may identify whether the authentication information generated by using the OTP check algorithm and KEY included in the filter 212 and the protection information included in the header of the control data packet are matched. For example, when the authentication information and the protection information are not matched, the filter 212 may drop the data packet (operation 750). For another example, when the authentication information and the protection information are matched, the filter 212 may forward the control data packet to the processor 222 (operation 755). When the control data packet is forwarded to the processor 222, the processor 222 may process the control data packet (e.g., may connect to the controller and may generate the control flow) and may return a result to the node 201 (operation 765).

In an embodiment, when the control flow identification information included in the control data packet is not in an initialization state, the filter 212 may identify whether the control flow identification information included in the control data packet is present based on a database (or a control flow table (e.g., the control flow table 316 of FIG. 3)). When the control flow identification information is present in the database, the filter 212 may identify whether the authentication information generated by using the OTP check algorithm and KEY included in the control flow information and the protection information included in the header of the control data packet are matched. For example, when the authentication information and the protection information are not matched, the filter 212 may drop the control data packet (operation 750). For another example, when the authentication information and the protection information are matched, the filter 212 may forward the control data packet to the processor 222 (operation 755). The processor 222 may process the forwarded control data packet (e.g., control flow update, termination, network access, or the like) and may return a result to the node 201 (operation 765).

According to an embodiment, in operation 760, the processor 222 may obtain a control data packet-dropped log from the filter 212. The processor 222 may identify conditions, such as the number of times of authentication failure of the control data packet for each identification information of the node 201 by a blacklist policy (e.g., the blacklist policy 314), a time, a drop cause of a data packet, or the like, and may determine whether to add the node 201 to a blacklist.

In operation 770, the node 201 may process a control data packet processing result received from the controller 202. For example, the control data packet processing result may be a result of a control-related request. For another example, the control data packet processing result may include at least one of a control flow update processing result, a control flow generation processing result, a control flow deletion processing result, and a network access success or failure processing result.

Figure 8:
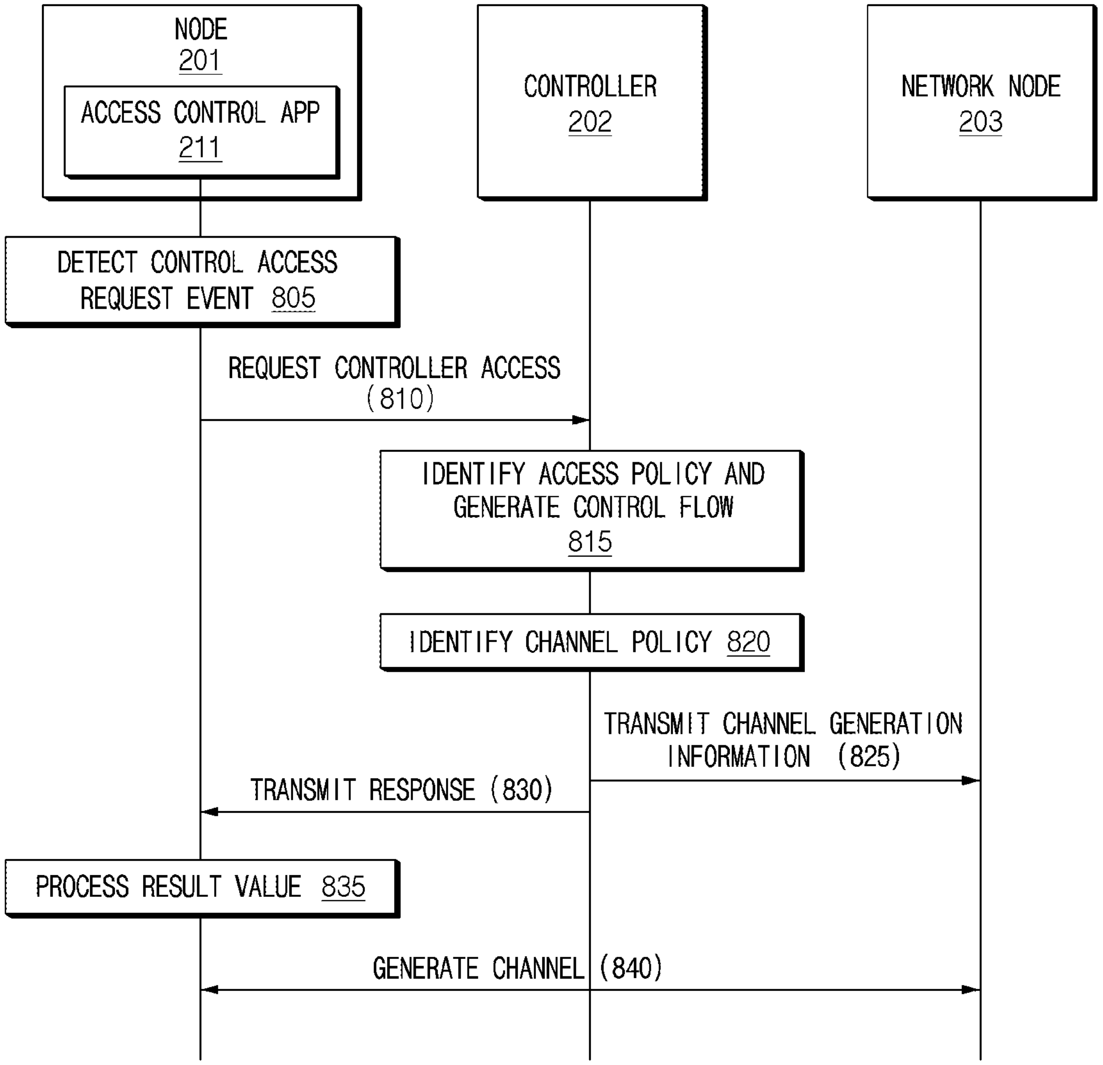
FIG. 8 illustrates a signal flow diagram for accessing a controller, according to various embodiments.

FIG. 8 illustrates a signal flow diagram for accessing a controller, according to various embodiments.

Because the node 201 need be authorized by the controller 202 to access or receive a network, the access control application 211 of the node 201 may request the controller 202 to generate a control flow such that the controller access of the node 201 is attempted.

Referring to FIG. 6, in operation 805, the node 201 may detect a controller access event. For example, the node 201 may detect that the access control application 211 is installed and executed in the node 201 and that the access to the controller 202 is requested through the access control application 211.

In operation 810, the node 201 may request a controller access from the controller 202 in response to detecting the controller access event. The node 201 may request the controller access through the access control application 211. According to an embodiment, the access control application 211 may transmit, to the controller 202, identification information (e.g., a terminal ID, an IP address, or a MAC address) of the node 201, a type, a location, identification information of a network to which the node 201 belongs, and/or identification information of the access control application 211.

In operation 815, the controller 202 may identify whether the access of the node 201 is possible, in response to the received request. According to an embodiment, the controller 202 may identify whether the access of the node 201 is possible, based on a database included in a memory (e.g., the memory 330 of FIG. 3) of the controller 202. For example, the controller 202 may identify whether the access of the node 201 is possible, based on whether information received from the access control application 211 is included in an access policy database and whether identification information of the node 201 and/or the network to which the node 201 belongs is included in a blacklist database.

When the access of the node 201 is possible, the controller 202 may generate a control flow between the node 201 and the controller 202. In this case, the controller 202 may generate control flow identification information in the form of a random number and may store the identification information of the node 201 and/or the network to which the node 201 belongs in a control flow table. The information (e.g., the control flow identification information and/or the control flow information) stored in the control flow table may be used to authenticate the user of the node 201, to update information of the node 201, to identify a policy for the network access of the node 201, and/or to check validity.

The controller 202 may generate a data flow by cataloging an application accessible through an access policy (e.g., the access policy 313 of FIG. 3) matched with identification information of the node 201 or identification information of a source network, destination network identification information, and service port information. For the node 201 and the network node 203 to identify whether a data packet is authorized, the generated data flow may include a data packet authentication method and an authentication header generation method or fixed header information. For another example, the node 201, the controller 202, or the network node 203 may manage the flow of the authorized data packet based on the generated data flow.

In operation 820, the controller 202 may identify channel information which should be generated to access a network based on the data flow, in a channel policy (e.g., the channel policy 313 of FIG. 3). For example, the controller 202 may identify the network node 203 which will generate a channel, a channel kind, and method information, may generate a series of information (e.g., a channel kind, a method, authentication information, network node (203) IP and port, authentication information for channel data packet authentication, and the like) necessary for generating a channel between the node 201 and the network node 203, and may update channel information to be used for the data flow. In an embodiment, the controller 202 may transmit the generated channel generation information to the network node 203 (operation 825). In another embodiment, the controller 202 may transmit the generated data flow to the network node 203.

The controller 202 may transmit identification information of the generated control flow, the data flow, and the channel generation information to the node 201 (operation 830). In an embodiment, when the generated data flow does not exist, the controller 202 may not transmit data flow information to the node 201 or the network node 203.

In operation 835, the node 201 may process a result value of the response received from the controller 202. For example, when there is a need to generate a new channel, the access control application 211 may generate a channel mutually by requesting the network node 203 to generate a channel based on the received channel generation information and may add the generated channel information to the channel table (operation 840). For another example, when the access control application 211 fails in the generation of a channel, the access control application 211 may display a channel generation-impossible message and a cause and may delete the data flow capable of connecting to the corresponding channel. In an embodiment, operation 840 may be performed by the operations illustrated in FIGS. 11 and 12.

Figure 9:
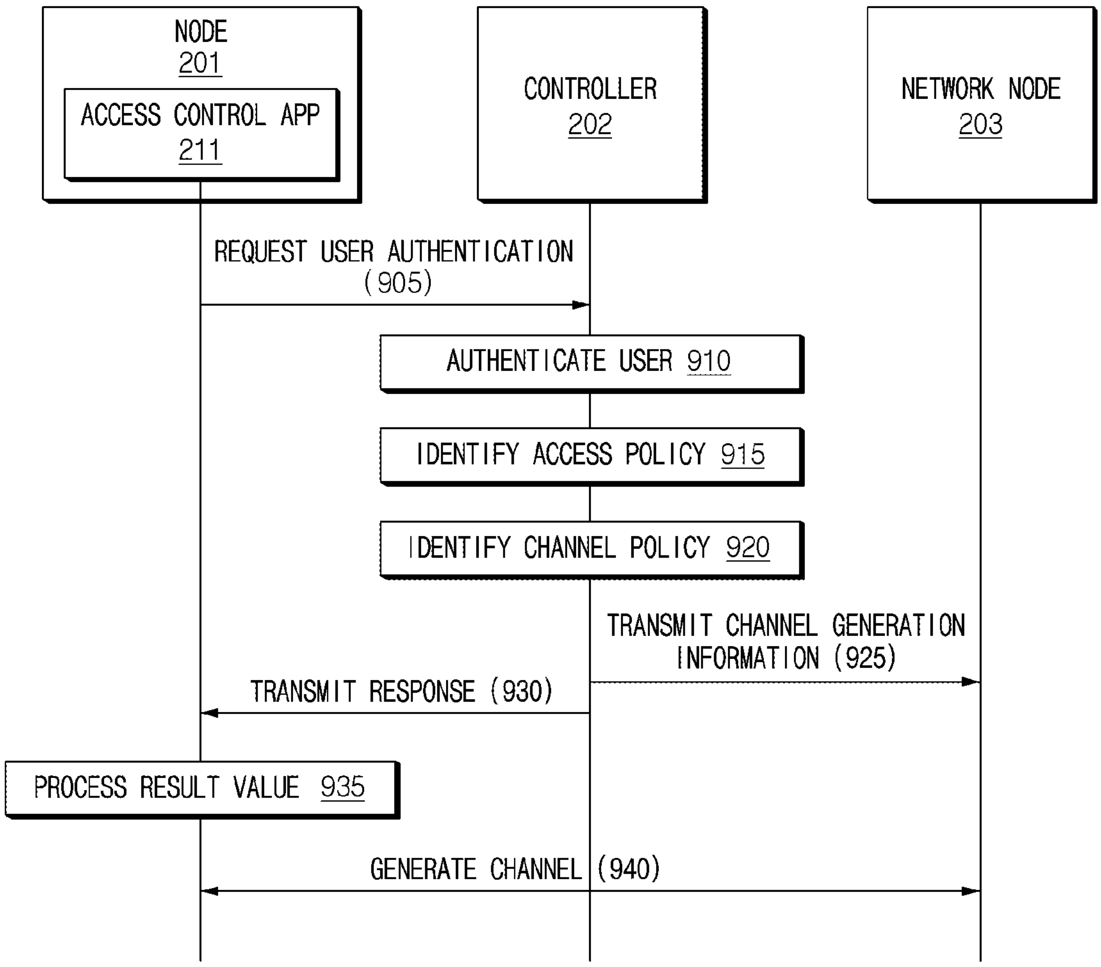
FIG. 9 illustrates a signal flow diagram for user authentication, according to various embodiments.

FIG. 9 illustrates a signal flow diagram for user authentication, according to various embodiments.

For the node 201 to obtain a detailed authority to access a destination network, the access control application 211 of the node 201 may obtain certification for a user of the node 201 from the controller 202.

Referring to FIG. 9, in operation 905, the node 201 may request user authentication from the control 202. For example, the access control application 211 may receive an input for user authentication, and the input for user authentication may be, for example, an input of the user entering a user ID and a password. As another example, the input for user authentication may be a user input (e.g., biometric information) for more enhanced authentication. The access control application 211 may transmit input information for user authentication to the controller 202. When the control flow between the node 201 and the controller 202 is already generated, the access control application 211 may transmit the input information for user authentication together with control flow identification information.

In operation 910, the controller 202 may authenticate the user based on the information received from the node 201. For example, the controller 202 may determine whether the user is accessible depending on an access policy and whether the user is included in a blacklist, based on a user ID, a password, and/or enhanced authentication information, which are included in the received information, and a database (e.g., the access policy database 311 or the blacklist database 314 of FIG. 3) included in a memory of the controller 202.

When the user is authenticated, the controller 202 may add identification information (e.g., a user ID) of the user to the control flow identification information. The added user identification information may be used for the authenticated user to access a controller or a network.

In operation 915, the controller 202 may generate a data flow by cataloging an application accessible through an access policy (e.g., the access policy 311 of FIG. 3) matched with identification information of the node 201 or identification information of a source network, destination network identification information, and service port information. For the node 201 and the network node 203 to identify whether a data packet is authorized, the generated data flow may include a data packet authentication method and an authentication header generation method or fixed header information.

In operation 920, the controller 202 may identify channel information which should be generated to access a network based on the data flow, in a channel policy (e.g., the channel policy 313 of FIG. 3). For example, the controller 202 may identify the network node 203 which will generate a channel, a channel kind, and method information, may generate a series of information (e.g., a channel kind, a method, authentication information, network node (203) IP and port, authentication information for channel data packet authentication, and the like) necessary for generating a channel between the node 201 and the network node 203, and may update channel information to be used for the data flow. In an embodiment, the controller 202 may transmit the generated channel generation information to the network node 203. In another embodiment, the controller 202 may transmit the generated data flow to the network node 203.

The controller 202 may transmit identification information of the generated control flow, the data flow, and the channel generation information to the node 201 (operation 930). In an embodiment, when the generated data flow does not exist, the controller 202 may not transmit data flow information to the node 201 or the network node 203.

In operation 935, the node 201 may process a result value of the response received from the controller 202. For example, when there is a need to generate a new channel, the access control application 211 may generate a channel mutually by requesting the network node 203 to generate a channel based on the received channel generation information and may add the generated channel information to the channel table (operation 940). For another example, when the access control application 211 fails in the generation of a channel, the access control application 211 may display a channel generation-impossible message and a cause and may delete the data flow capable of connecting to the corresponding channel. In an embodiment, operation 940 may be performed by the operations illustrated in FIGS. 11 and 12.

Also, in operation 935, the node 201 may output a user interface screen, which indicates that the user authentication is completed, to the user through a display.

According to another embodiment, the controller 202 may determine that the user authentication is impossible. For example, when the identification information of the user is included in a blacklist database, the controller 202 may determine that the user authentication is impossible. In this case, in operation 930, the controller 202 may transmit information, which indicates that the user authentication is impossible, to the node 201. In operation 935, the node 201 may output the user interface screen, which indicates that the user authentication is failed, through the display.

Figure 10:
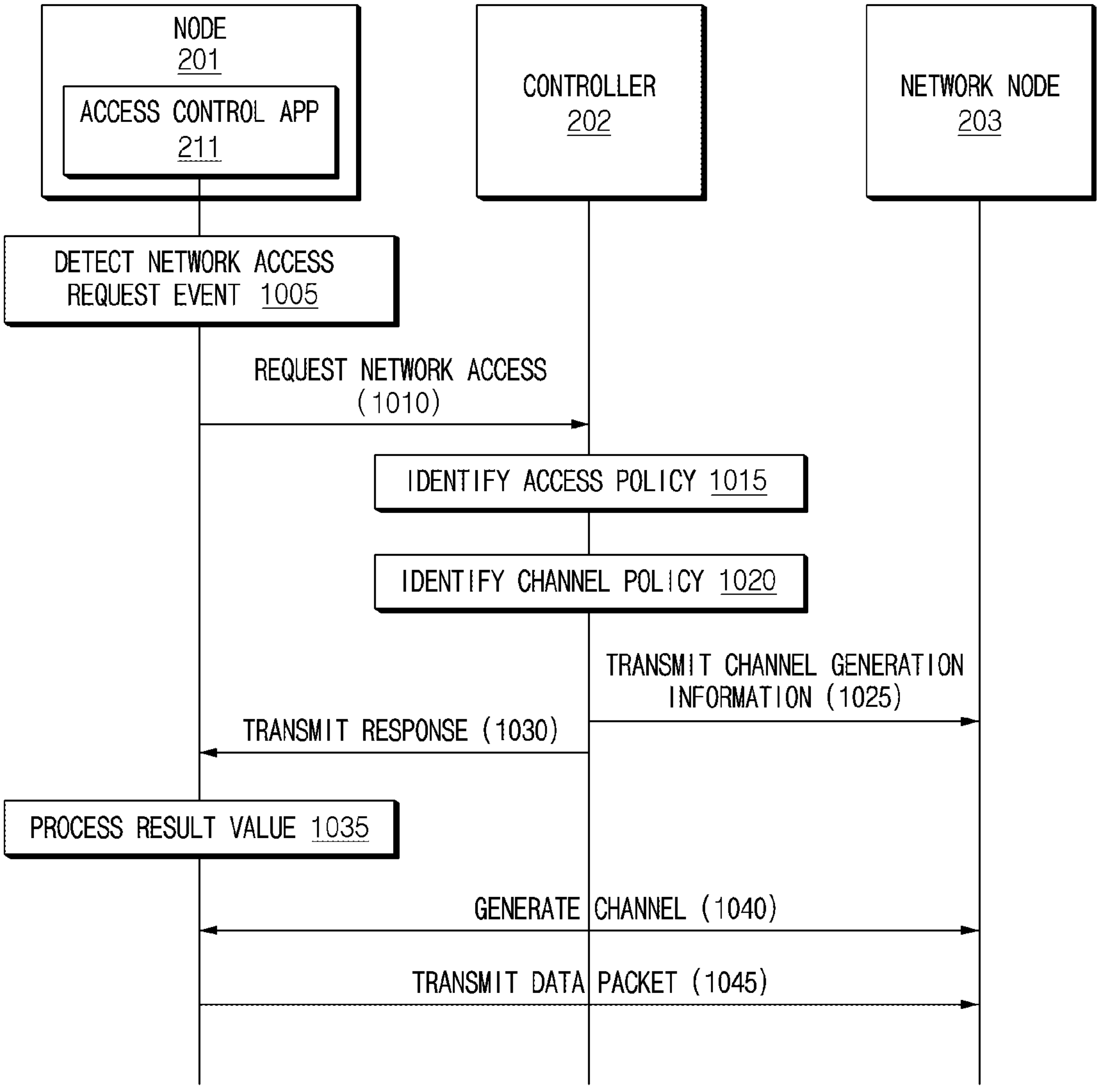
FIG. 10 illustrates a signal flow diagram for accessing a network, according to various embodiments.

FIG. 10 illustrates a signal flow diagram for accessing a network, according to various embodiments.

After the node 201 is authorized from the controller 202, the node 201 may control a network access of other applications stored in the node 201 through the access control application 211 of the node 201, and thus, trusted data transmission may be guaranteed.

Referring to FIG. 10, in operation 1005, the access control application 211 may detect a network access event. For example, the access control application 211 may detect that a target application such as a web browser attempts to access a destination network including a destination network such as the Internet. For example, the user may execute the web browser and may input and call a web address to be accessed.

In operation 1010, the access control application 211 may request the network access of the target application from the controller 202. In this case, the access control application 211 may transmit identification information of the target application and identification information and port information of the destination network to the controller 202 together with identification information of the control flow generated between the node 201 and the controller 202.

In operation 1015, the controller 202 may identify an access policy based on the request received from the access control application 211 and the database of the controller 202. For example, the controller 202 may determine whether the access of the target application is possible, based on whether the information received from the access control application 211 is included in the access policy included in the database of the controller 202. When the access of the target application is impossible, in operation 1030, the controller 202 may transmit, to the node 201, information indicating that the access is impossible. In this case, the access control application 211 may drop a data packet of the target application and may output a user interface screen indicating that the access to the network is impossible, through the display.

When the access of the target application is possible, in operation 1020, the controller 202 may identify a channel policy (e.g., the channel policy 313 of FIG. 3) which should be generated to access the destination network and may identify whether a valid channel generated to the network node 203 is present in a channel table (e.g., the channel table 318 of FIG. 3). For example, when the generated valid channel does not exist, the controller 202 may generate a series of information (e.g., a channel kind, a method, authentication information, network node (203) IP and port, authentication information for channel data packet authentication, and the like) necessary to generate a channel between the node 201 and the network node 203. For another example, when a channel policy capable of generating does not exist, the controller 202 may transmit an access-impossible result to the node 201 (operation 1030). For another example, when a previously generated channel exists, the controller 202 may transmit information about the previously generated channel to the node 201 (operation 1030).

The controller 202 may update the data flow based on the generated channel information. Also, when the controller 202 should generate a new channel, the controller 202 may transmit the updated data flow and the channel generation information to the node 201 and the network node 203 (operation 1025 and operation 1030). In an embodiment, when the updated data flow does not exist or when it is impossible to generate a channel, the controller 202 may not transmit the channel generation information and the data flow information to the node 201 or the network node 203.

In operation 1035, the access control application 211 of the node 201 may process a result value for the response transmitted from the controller 202. In an embodiment, when the access control application 211 receives the information indicating that the network access of the target application is impossible or the information indicating that an authorized channel does not exist, the access control application 211 may drop a data packet and may output a user interface screen indicating that the network access is impossible.

In another embodiment, when the channel generation information is received from the controller 202, the access control application 211 may generate a channel with the network node 203 in operation 1040 and may transmit the data packet of the target application to the network node 203 through the generated channel in operation 1045. In this case, when the data packet is received through the authorized channel, the network node 203 may forward the received data packet to a destination (e.g., a destination network). In an embodiment, operation 1040 may be performed by the operations illustrated in FIG. 11 and FIG. 12.

According to another embodiment, when the access control application 211 receives existing channel information from the controller 202, in operation 1045, the access control application 211 may transmit a data packet of the target application to the network node 203 through a channel corresponding to the channel information without performing an additional channel generation procedure.

According to another embodiment, when the access control application 211 fails in channel generation, the access control application 211 may drop a data packet of the target application and may output a user interface screen indicating that the network access is impossible.

According to an embodiment, before performing operation 1010, the access control application 211 may first identify whether a data flow authorized from the controller 202 is present between the target application and the destination network. For example, the access control application 211 may identify identification information of the target application, destination network identification information, and service port information and may identify whether there is an authorized data flow corresponding to information identified from a data flow table stored in a memory of the node 201. When the authorized data flow exists, in operation 1045, the access control application 211 may transmit a data packet of the target application depending on an authorized data flow policy, without requesting the network access. When the authorized data flow does not exist, in operation S1010, the access control application 211 may request the network access. Meanwhile, when the authorized data flow exists but is invalid (e.g., when a channel does not exist or when the access to the destination node is impossible), the access control application 211 may drop a data packet of the target application.

According to an embodiment, when the data flow does not exist or when there is a need to update the data flow (e.g., when an authentication time is expired), the access control application 211 may further check the validity of the target application before requesting the network access. For example, the access control application 211 may determine whether the target application is forged or tampered or may check code signing and/or a fingerprint. For example, when the access control application 211 fails in the validity check of the target application, the access control application 211 may drop the data packet of the target application without requesting the network access. In this case, the access control application 211 may display a user interface screen indicating that the access is impossible. For another example, when the access control application 211 succeeds in the validity check of the target application, in operation 1010, the access control application 211 may request the network access.

Figure 11:
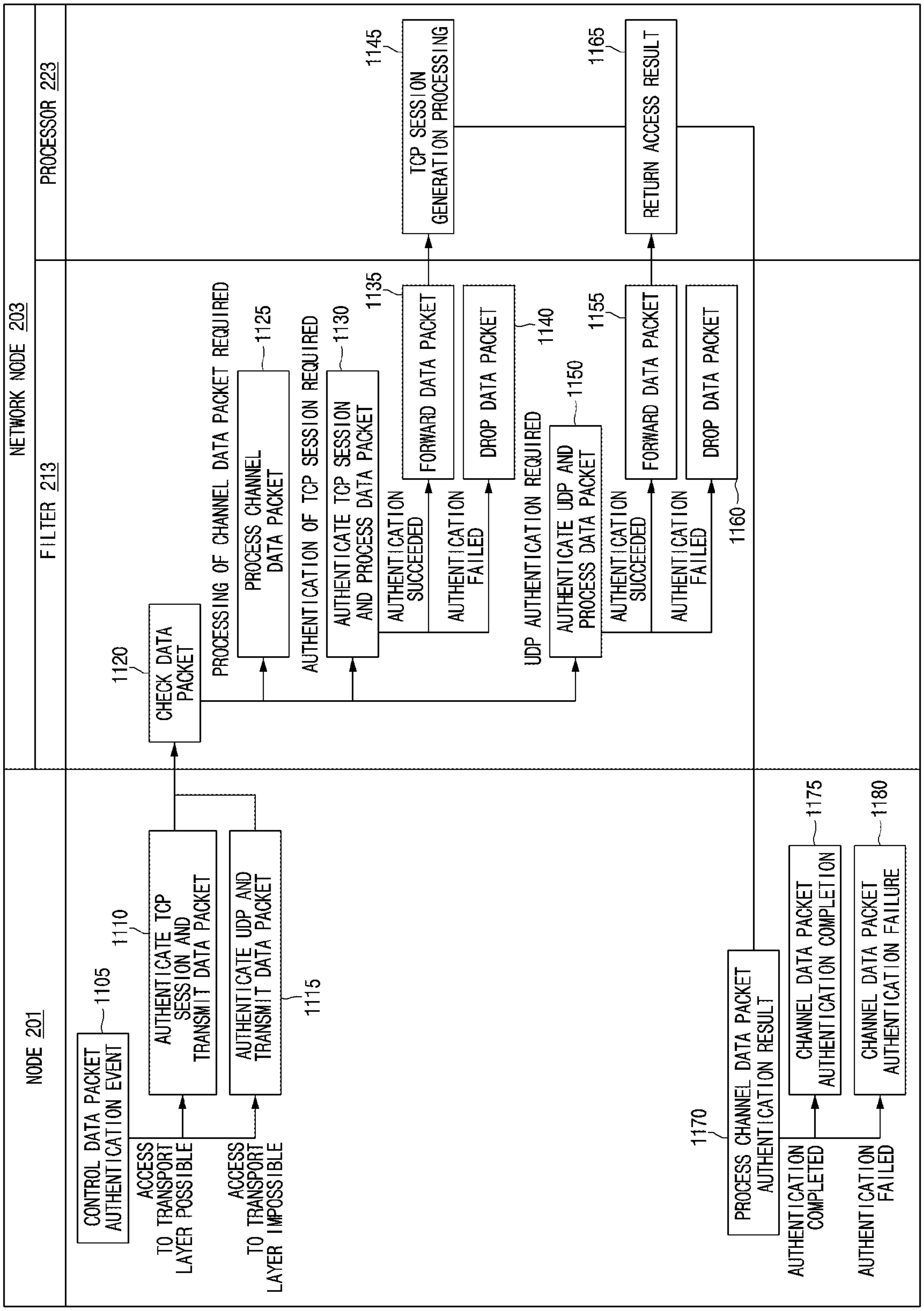
FIG. 11 illustrates a signal flow diagram for authenticating a channel data packet, according to various embodiments.

FIG. 11 illustrates a signal flow diagram for authenticating a channel data packet, according to various embodiments.

The node 201 may perform authentication for a data packet (e.g., a channel data packet) with the filter 213 of the network node 203; when the authentication is failed, the data packet may be dropped by the filter 213 such that the data packet is not transmitted to the processor 223 controlling the service of the network node 203.

Referring to FIG. 11, in operation 1105, the access control application 211 of the node 201 may detect a channel data packet authentication event. For example, when the access control application 211 of the node 201 communicates with the network node 203 (e.g., channel generation, update, termination, normal data packet transmission, or the like), the access control application 211 may transmit a channel data packet to the network node 203. In this case, when the control data packet is determined as before being authenticated, the access control application 211 may perform an operation for authenticating the channel data packet.

The access control application 211 may determine a communication protocol based on whether the access to an operating system transport layer is possible. For example, the communication protocol may include a TCP protocol or an UDP protocol. According to an embodiment, when the access of the node 201 to the operating system transport layer is possible, the access control application 211 may request a TCP protocol-based access from network node 203. In this case, the access control application 211 may insert and transmit authentication information stored in the access control application 211 or channel generation authentication information received from the controller 202 into the payload of the TCP SYN packet to be transmitted to the network node 203 (operation 1110). For example, the authentication information stored in the access control application 211 or the channel generation authentication information received from the controller 202 may include OTP information generated by using the OTP generation algorithm and KEY information. In another embodiment, when the access of the node 201 to the operating system transport layer is impossible, the access control application 211 may request an UDP protocol-based access from the network node 203. In this case, the access control application 211 may generate a data packet based on the OTP information generated by using the OTP generation algorithm and KEY information included in the access control application 211 or the channel generation authentication information received from the controller 202 and may transmit the data packet to the controller 202 based on the UDP protocol (operation 1115).

In operation 1120, the filter 213 of network node 203 may check the data packet (e.g., a channel generation authentication data packet) received from the access control application 211. For example, the filter 213 may check the data packet based on a kind of a communication protocol through which the data packet is received and whether authentication information is included in the data packet.

In an embodiment, when the communication protocol of the received data packet is the TCP protocol and the data packet is not the TCP SYN packet, the filter 212 may process the channel data packet (operation 1125) or may forward the data packet. For example, operation 1125 may be performed by performing operation 1230 to operation 1250 illustrated in FIG. 12. For another example, when operation 1125 is performed, operation 1130 to operation 1180 may not be performed.

In an embodiment, when the communication protocol of the received data packet is the TCP protocol and the data packet is the TCP SYN packet, the filter 213 may identify whether the authentication information is included in the data packet. For example, when the authentication information is included in the data packet, the filter 213 may process the data packet (e.g., authentication data packet) by checking the authentication information (operation 1130). For example, whether authentication information generated based on the OTP check algorithm and KEY included in the filter 213 and the authentication information included in the data packet are matched may be compared. When the pieces of authentication information are matched, the filter 213 may add the identification information of the node 201 to an authentication table (e.g., the authentication table 319 of FIG. 3) and may forward the data packet to the processor 223 (operation 1135). When the data packet is forwarded, the processor 223 may receive a data packet for TCP session generation from the node 201, may provide a response to the node 201, and may generate the TCP session with the node 201 (operation 1145). For another example, when the pieces of authentication information are not matched, the filter 212 may drop the data packet (operation 1140).

In an embodiment, when the communication protocol of the received data packet is the TCP protocol and the data packet is the TCP SYN packet, the filter 213 may identify whether the authentication information is included in the data packet. For example, when the authentication information is not included in the data packet, the filter 213 may identify whether the identification information of the node 201 is present in the authentication table; when the authentication information of the node 201 exists, the filter 213 may forward the data packet to the processor 223; when the authentication information of the node 201 does not exist, the filter 213 may drop the data packet (operation 640).

In an embodiment, when the communication protocol of the received data packet is the UDP protocol and the authentication information is included in the data packet, the filter 213 may process the data packet (e.g., a channel authentication data packet) by checking the authentication information (operation 1150). For example, the filter 213 may compare whether the authentication information generated based on the OTP check algorithm and KEY included in the filter 213 is matched with the authentication information included in the data packet. When the pieces of authentication information are matched, the filter 213 may add the identification information of the node 201 to an authentication table (e.g., the authentication table 319 of FIG. 3) and may forward the data packet to the processor 223 (operation 1155). When the data packet is forwarded, the processor 223 may return an access result and may transmit an authentication-completed data packet to the node 201 (operation 1165). For another example, when the pieces of authentication information are not matched, the filter 213 may drop the data packet (operation 1160).

In an embodiment, when the communication protocol of the received data packet is the UDP protocol and the authentication information is not included in the data packet, the filter 213 may identify whether the identification information of the node 201 is present in the authentication table. For example, when the identification information of the node 201 is present in the authentication table, the filter 213 may forward the data packet to the processor 223. For another example, when the identification information of the node 201 is absent from the authentication table, the filter 213 may drop the data packet.

The access control application 211 of the node 201 may receive an authentication result of the channel data packet from network node 203 and may process the authentication result (operation 1170). For example, when an authentication success result is received (e.g., when the generation of the TCP session is completed and the authentication-completed data packet is received), the access control application 211 may change an authentication state of the channel data packet to "success (e.g., completion)". For another example, when an authentication failure result is received (e.g., when the data packet is dropped), the access control application 211 may set the authentication state of the channel data packet to "failure (e.g., non-completion)". In this case, the access control application 211 may retry authentication for the channel data packet.

According to an embodiment, in operation 1120, the filter 213 may further identify whether the identification information of the node 201 is included in a blacklist (e.g., the blacklist 315 of FIG. 3), based on 5 Tuple information of the received data packet. For example, when the identification information of the node 201 is included in the blacklist, the filter 213 may drop the data packet and may not perform operation 1125 to operation 1165.

According to an embodiment, in operation 1120, the filter 213 may further identify whether a port through which the data packet is received is a port being used for reception in the network node 203. For example, when the port through which the data packet is received is not a port being used for reception in the network node 203, the filter 213 may drop the received data packet.

Figure 12:
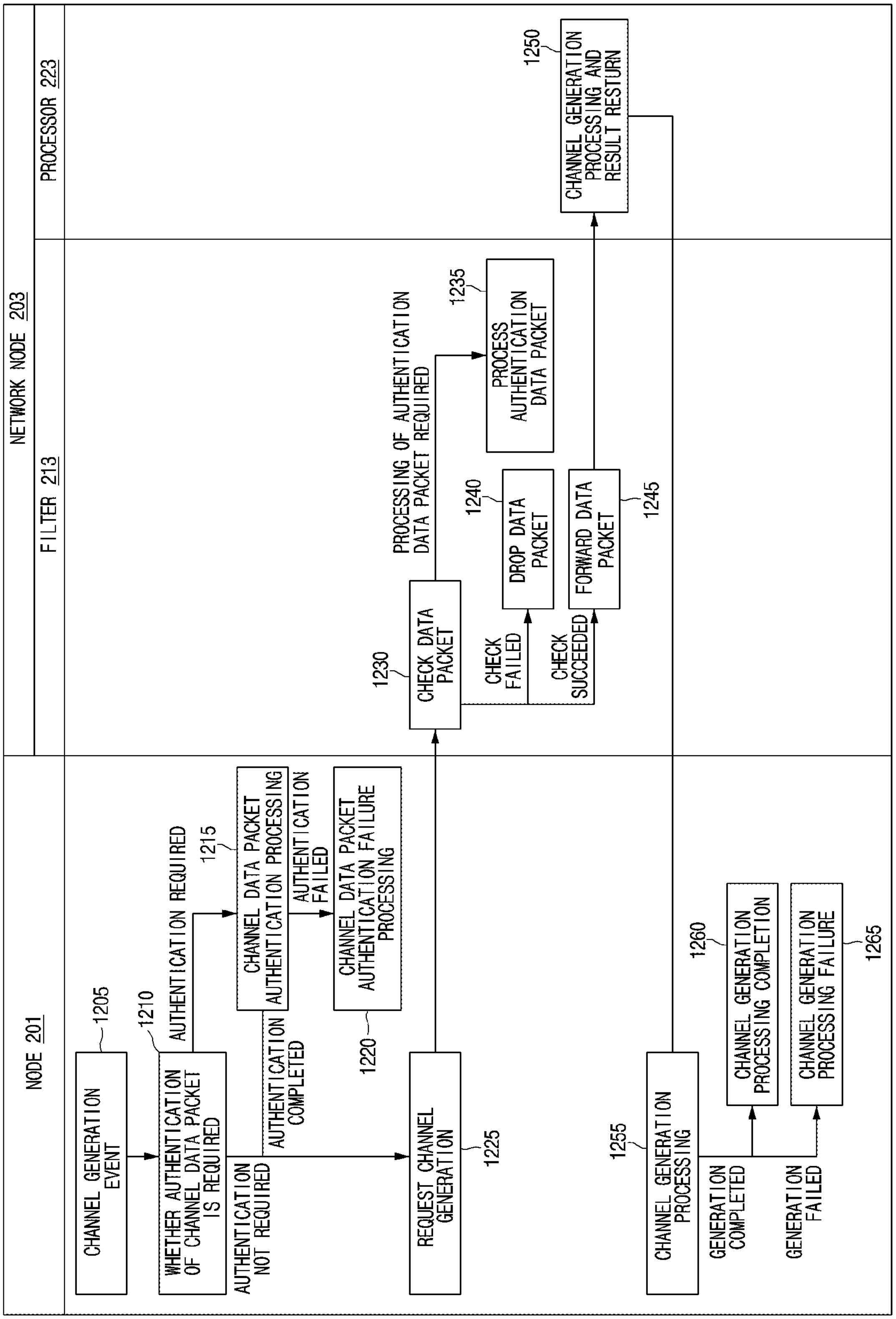
FIG. 12 illustrates a signal flow diagram for generating a channel, according to various embodiments.

FIG. 12 illustrates a signal flow diagram for generating a channel, according to various embodiments.

For the node 201 to generate a channel with the network node 203, there may be a need to transmit a channel data packet so as to be processed from the network node 203. Accordingly, the access control application 211 of the node 201 may request processing of the control data packet by transmitting the channel data packet to the network node 203.

Referring to FIG. 12, in operation 1205, the access control application 211 of the node 201 may detect a channel generation event. For example, the access control application 211 may detect the channel generation event for performing channel generation for the network node 203.

In operation 1210, the access channel application 211 may identify whether there is a need to authenticate a channel data packet. For example, the access control application 211 may identify whether the authentication of the channel data packet is required, by identifying an authentication state of the channel data packet. According to an embodiment, when it is identified that the authentication of the control data packet is required, the access control application 211 may perform channel data packet authentication processing (operation 1215). Operation 1215 may be performed by the operations illustrated in FIG. 11. When the authentication is successful, the access control application 211 may perform operation 1225; when the authentication is failed, in operation 1220, the access control application 211 may process the authentication for the channel data packet as failure.

In operation 1225, the access control application 211 may request the network node 203 to generate a channel, based on channel generation information received from the controller 202 through a channel processing device (e.g., IPSec, VPN, SSL VPN, SSL/TLS, or the like) included in the node 201.

When the filter 213 of the controller 202 receives the channel data packet from the node 201, in operation 1230, the filter 213 may check the channel data packet. For example, the filter 213 may check the channel data packet based on a kind of the communication protocol of the received channel data packet and whether authentication information is included in the received channel data packet.

In an embodiment, when the channel data packet is received through the UDP protocol and includes information for authenticating the channel data packet, the filter 213 may perform operation 1235. For example, operation 1235 may be performed through at least some of the operations illustrated in FIG. 11.

In an embodiment, when the channel data packet is received through the UDP protocol and does not include the information for authenticating the channel data packet, the filter 213 may identify whether the identification information of the node 201 is present in the authentication table. When the identification information of the node 201 is present in the authentication table, the filter 213 may forward the data packet (operation 1245); when the identification information of the node 201 is absent from the authentication table, the filter 213 may drop the data packet (operation 1240).

In an embodiment, when the channel data packet is received through the TCP protocol, the channel data packet is the TCP SYN packet, and authentication information is present in the payload of the channel data packet, the filter 213 may perform authentication data packet processing based on the received channel data packet (operation 1235). For example, operation 1235 may be performed through the operations illustrated in FIG. 11.

In an embodiment, when the channel data packet is received through the TCP protocol, the channel data packet is the TCP SYN packet, and authentication information is absent from the payload of the channel data packet, the filter 213 may identify whether the identification information of the node 201 is present in an authentication table (e.g., the authentication table 319 of FIG. 3). When the identification information of the node 201 is absent from the authentication table, the filter 213 may drop the control data packet (operation 1240); when the identification information of the node 201 is present in the authentication table, the filter 212 may forward the data packet (operation 1245).

In an embodiment, when the channel data packet is received through the TCP protocol and the channel data packet is not the TCP SYN packet, the filter 213 may forward the data packet (operation 1245).

In operation 1250, the processor 223 may perform channel generation processing based on the channel data packet forwarded from the filter 213. For example, when the channel is normally generated, the processor 223 may return a result indicating that the channel is generated, to the node 201.

In operation 1255, the access control application 211 of the node 201 may perform channel generation processing based on the channel generation result received from the network node 203. For example, when the channel is normally generated, the access control application 211 may complete channel generation processing and may update channel information in a channel table (operation 1260). For another example, when the channel is not normally generated, the access control application 211 may delete a data flow corresponding to the relevant channel data packet or may again request the network node 203 to generate a channel.

Figure 13:
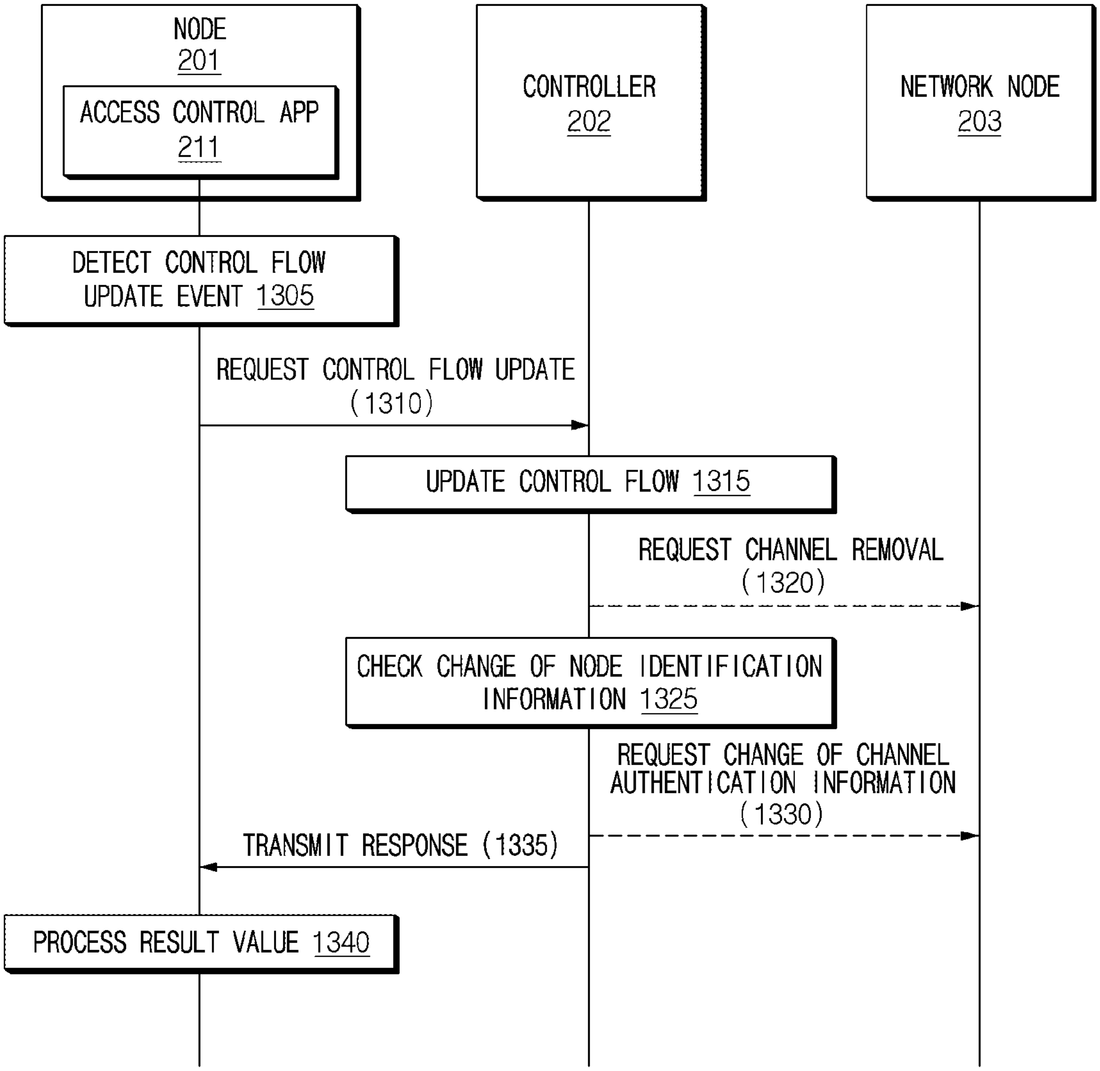
FIG. 13 indicating a signal flow diagram for updating a control flow, according to various embodiments.

FIG. 13 indicating a signal flow diagram for updating a control flow, according to various embodiments.

The node 201 may receive changed data flow information from the controller 202 by updating a control flow every specified period.

Referring to FIG. 13, in operation 1305, the node 201 may detect a control flow update event. For example, the access control application 211 may detect the control flow update event at a specified period.

In operation 1310, the node 201 may request the controller 202 to update the control flow. The requested information may include identification information of the control flow between the node 201 and the controller 202.

In operation 1315, the controller 202 may identify whether the control flow identification information received from the node 201 is present in a control flow table. When the control flow exists, the controller 202 may update an update time and may search for data flow information dependent on the corresponding control flow. When a data flow, whose re-authentication is required or through which the access is impossible anymore, from among data flows exists, the controller 202 may transmit the corresponding data flow information to the node 201 together with the updated control flow identification information (operation 1335). In another embodiment, when the control flow identification information is absent from the control flow table or when the control flow is invalid, the control flow may be removed, and access-impossible information may be transmitted to the node 201 (operation 1335).

According to an embodiment, when it is determined that the control flow is in a state where the access is impossible anymore, the controller 202 may remove a channel corresponding to the corresponding control flow and may request the network node 203 to remove the channel (operation 1320).

In operation 1325, the controller 202 may check node identification information. For example, the controller 202 may identify whether the identification information of the node 201 is changed, by comparing the identification information of the node 201 with identification information of a node on the control flow. When the identification information of the node is changed, the controller 202 may change the identification information of the node 201 included in an authentication table of the network node 203 to the changed identification information of the node 201. If necessary, the controller 202 may generate new authentication information for again performing channel data packet authentication and may transmit the new authentication information to the network node 203. Accordingly, the controller 202 may manage the node 201 to continuously communicate with the network node 203 generating the channel (operation 1330).

In operation 1335, the controller 202 may transmit the control flow update result, the updated control flow identification information, and the data flow information to the node 201.

In operation 1340, the access control application 202 of the node 201 may process a result value of the response received from the controller 202. For example, when the control flow update result indicates a failure, the access control application 211 may terminate the corresponding application or may block all the network accesses of the application. For another example, when the control flow update result indicates "normal" and an updated data flow exists, the access control application 211 may update the data flow information and the control flow identification information. For another example, when the re-authentication of a data packet is required for each generated channel, the access control application 211 may request the network node 203 to authenticate the channel data packet based on the received authentication information.

Figure 14:
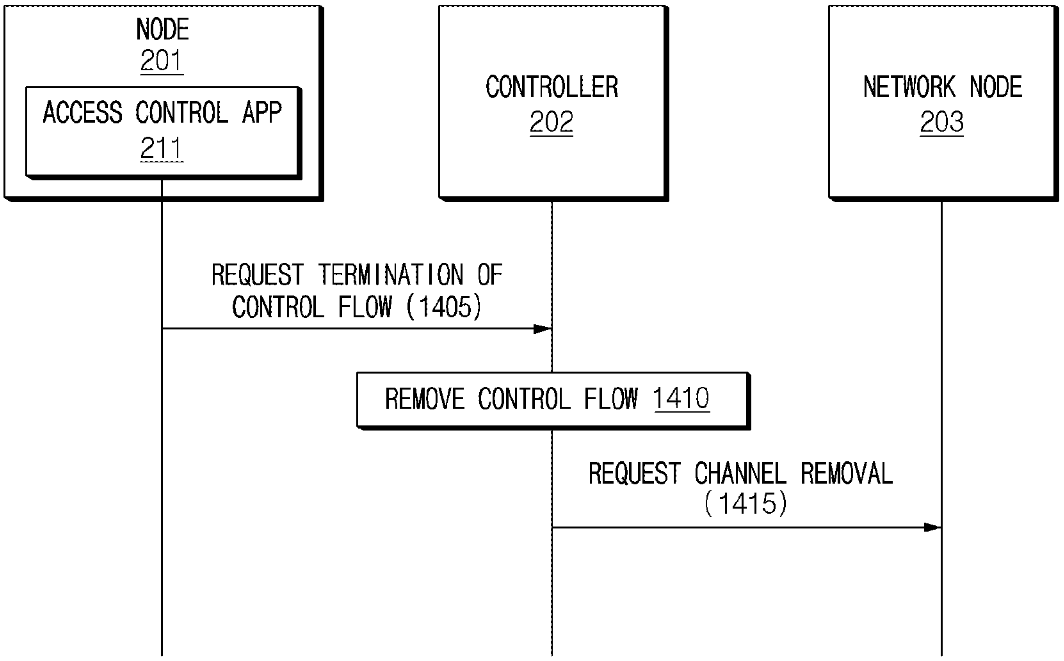
FIG. 14 illustrates a signal flow diagram for terminating a control flow, according to various embodiments.

FIG. 14 illustrates a signal flow diagram for terminating a control flow, according to various embodiments.

Referring to FIG. 14, when the access control application 211 is terminated, when the access control application 211 does not access a network anymore, or when an access termination request exists, in operation 1405, the node 201 may request the controller 202 to terminate the control flow. For example, the control flow termination request may include control flow identification information.

In operation 1410, the controller 202 may remove the control flow based on the control flow identification information received from the node 201.

In operation 1415, the controller 202 may remove a channel dependent on the removed control flow from a database and may request the network node 203 to remove a channel associated with the removed channel. When the channel is removed, the node 201 may be in a state of being incapable of transmitting a data packet to a destination network anymore.

Figure 15:
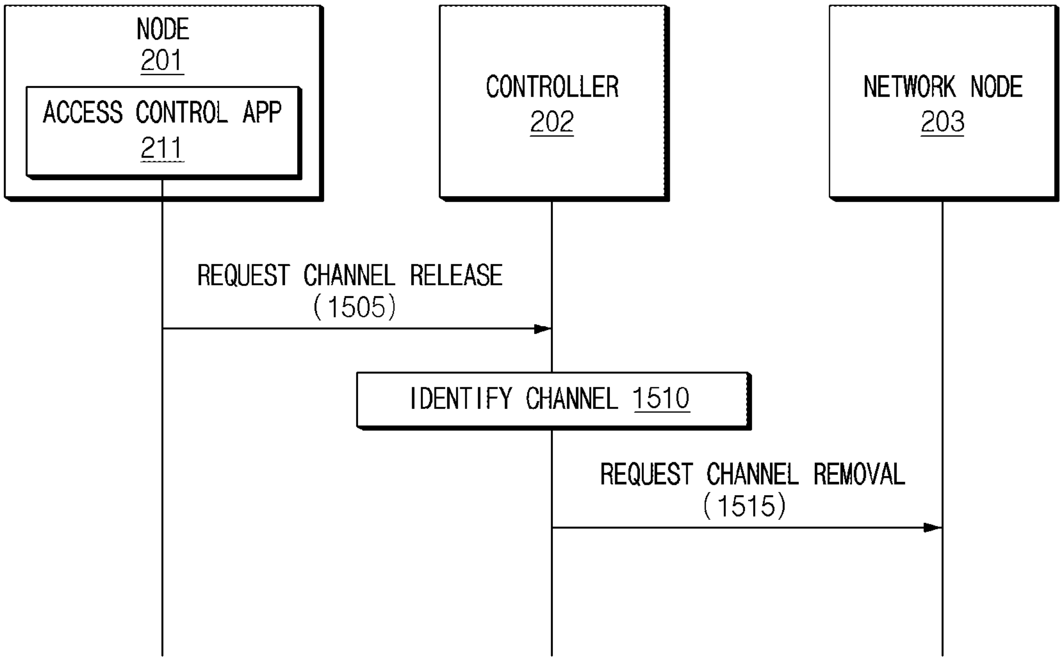
FIG. 15 illustrates a signal flow diagram for releasing a channel, according to various embodiments.

FIG. 15 illustrates a signal flow diagram for releasing a channel, according to various embodiments.

Referring to FIG. 15, when a channel generated between the node 201 and the network node 203 is released, in operation 1505, the access control application 211 may request the controller 202 to release the channel.

In operation 1510, the controller 202 may identify the channel based on received channel release information. For example, the controller 202 may identify whether the corresponding information is present in a channel table and may request the network node 203 to remove the channel (operation 1515). The node 201 is in a state of being incapable of requesting the network node 203 to authenticate a data packet and to generate a channel, by using authentication information used to generate a channel previously.

Figure 16:
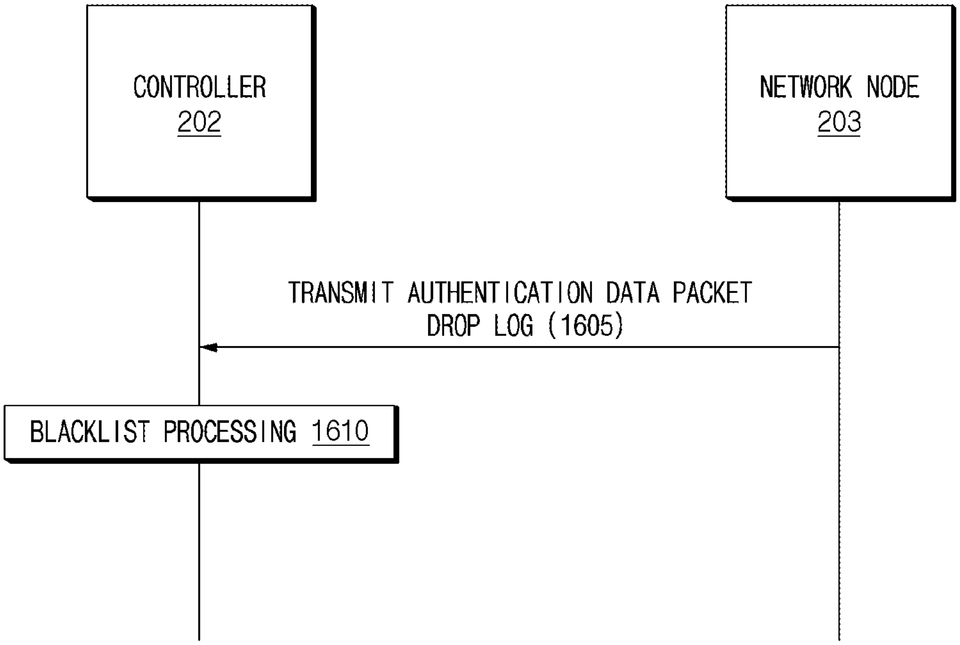
FIG. 16 illustrates a signal flow diagram for generating a blacklist, according to various embodiments.

FIG. 16 illustrates a signal flow diagram for generating a blacklist, according to various embodiments.

Referring to FIG. 16, in operation 1605, the network node 203 may transmit a drop log of an authentication data packet to the controller 202 in units of given period. For example, the network node 203 may store a drop log every identification information of the node 201 transmitting the authentication data packet and may transmit the stored drop log to the controller 202.

In operation 1610, the controller 202 may determine whether to process the corresponding node 201 as a blacklist, based on the received authentication data packet drop log. For example, the controller 202 may identify the received data packet drop log, may identify conditions, such as the number of times of authentication failure of a data packet corresponding to the identification information of the node 201, a time, a data packet drop cause, or the like, based on a blacklist policy (e.g., the blacklist policy 314) and may identify whether or not of addition to a blacklist.

When the node 201 corresponds to the blacklist condition, the identification information of the node 201 may be added to the blacklist, and thus, the network node 203 may block the node 201 from attempting an unauthorized access later.

Figure 17:
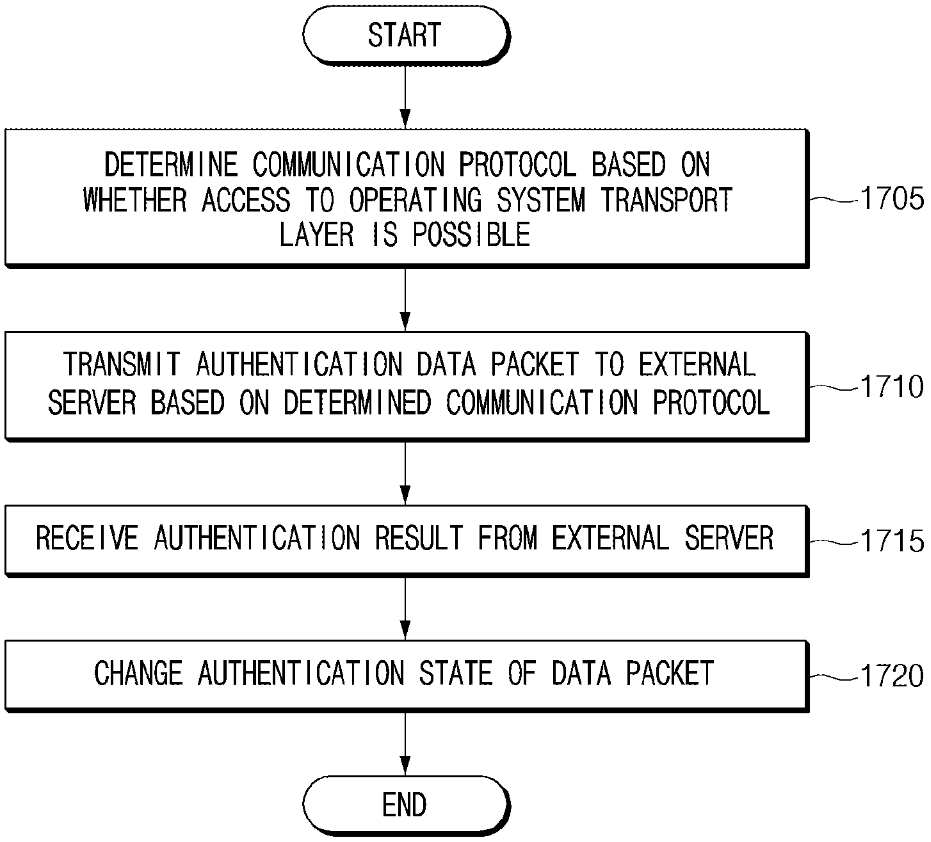
FIG. 17 is a flowchart illustrating an authentication operation between a node and a controller, according to various embodiments.

FIG. 17 is a flowchart illustrating an authentication operation between a node and a controller, according to various embodiments. Operations illustrated in FIG. 17 may be performed by the access control application 211 stored in the node 201 of FIG. 2.

Referring to FIG. 17, in operation 1705, the access control application 211 stored in the node 201 may determine a communication protocol based on whether the access to an operating system transport layer is possible. For example, when the access to the operating system transport layer is possible, the access control application 211 may determine the TCP protocol as the communication protocol; when the access to the operating system transport layer is impossible, the access control application 211 may determine the UDP protocol as the communication protocol.

In operation 1710, the access control application 211 may transmit an authentication data packet to an external server based on the determined communication protocol and may request authentication. For example, the access control application 211 may transmit a control authentication data packet to the controller 202 based on the TCP or UDP protocol, and the control authentication data packet may include authentication information stored in the access control application 211.

In operation 1715, the access control application 211 may receive an authentication result from the external server. For example, the access control application 211 may receive the authentication result of the control authentication data packet from the controller 202.

In operation 1720, the access control application 211 may change an authentication state of the control data packet based on the received authentication result. Afterward, when the access control application 211 performs a control data processing request for the external server, the access control application 211 may be based on the control data packet whose authentication state is changed. For example, the control data processing request for the external server may include at least one of a controller access request (e.g., the operation illustrated in FIG. 8), a user authentication request (e.g., the operation illustrated in FIG. 9), a network access request (e.g., the operation illustrated in FIG. 10), and a control flow update request (e.g., the operation illustrated in FIG. 13).

In an embodiment, the access control application 211 may perform the control data processing request for the external server based on the control data packet whose authentication state is updated.

The above description is merely an illustrative explanation of the technical idea disclosed in the present disclosure, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the technical idea disclosed in the present disclosure should be interpreted in accordance with the claims below, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A node, comprising:

a communication circuit;

a processor operatively connected to the communication circuit; and a memory operatively connected to the processor and configured to store a target application and an access control application, wherein the memory stores instructions causing, when executed by the processor, the node to:

determine a communication protocol based on whether an access to an operating system transport layer through the access control application is possible;

transmit an authentication data packet including first authentication information to an external server based on the determined communication protocol and request authentication, wherein the instructions cause the node to generate the authentication data packet by inserting the first authentication information into a payload of a transport-layer packet;

receive an authentication result of the authentication data packet from the external server; and set an authentication state of a control data packet based on the received authentication result and insert second authentication information corresponding to the authentication state into a header of the control data packet and perform a control data processing request for the external server based on the authentication state, wherein the node is configured to operate in a network environment where a filter at a network level validates the second authentication information included in the control data packet and drops the control data packet when validation fails before forwarding the control data packet to a service-level processor.

2. The node of claim 1, wherein the communication protocol includes a TCP protocol and an UDP protocol, wherein the instructions cause the node to:

when the access to the operating system transport layer is possible, transmit the authentication data packet through the access control application, based on a TCP protocol; and when the access to the operating system transport layer is impossible, transmit the authentication data packet through the access control application, based on a UDP protocol.

3. The node of claim 1, wherein the instructions cause the node to:

detect a control data packet transmission event through the access control application;

identify whether there is a need to authenticate the control data packet;

when there is a need to authenticate the control data packet, request the authentication;

when there is no need to authenticate the control data packet, insert the first authentication information or second authentication information received from the external server into a header of the control data packet and perform a control-related request by transmitting a control data packet into which the first authentication information or the second authentication information is inserted to the external server; and receive a result of the control-related request from the external server.

4. The node of claim 3, wherein the instructions cause the node to:

when the control-related request is a controller access request, receive control flow identification information, the second authentication information, a data flow, and channel generation information from the external server through the access control application.

5. The node of claim 3, wherein the instructions cause the node to:

when the control-related request is a user authentication request, transmit user input information to the external server, when the control-related request is performed, through the access control application; and receive a result of the user authentication request, control flow identification information, the second authentication information, a data flow, and channel generation information from the external server.

6. The node of claim 3, wherein the instructions cause the node to:

when the control-related request is a network access request, transmit control flow identification information, destination network identification information of the target application to the external server, when the control-related request is performed, through the access control application;

receive a data flow and channel generation information from the external server; and generate a channel with a network node based on the channel generation information.

7. The node of claim 1, wherein the instructions cause the node to:

receive channel generation information from the external server through the access control application, wherein the channel generation information includes channel generation authentication information;

transmit a channel generation authentication data packet including the channel generation authentication information to a network node based on the determined communication protocol and request channel generation authentication;

receive a channel generation authentication result of the channel generation authentication from the network node;

change an authentication state of a channel data packet based on the received channel generation authentication result; and generate a channel with the network node based on the channel data packet whose authentication state is changed.

8. The node of claim 7, wherein the instructions cause the node to:

transmit the channel data packet whose authentication state is changed, to the network node through the access control application and request channel generation;

receive a result of the channel generation request from the network node; and transmit a data packet of the target application to a destination network based on the generated channel.

9. A server, comprising:

a filter;

a communication circuit;

a memory configured to store a database; and a processor operatively connected to the filter, the communication circuit, and the memory, wherein the processor is configured to:

receive a control data packet from an access control application of a node;

identify a communication protocol through which the control data packet is received;

identify whether authentication information inserted into a header of the control data packet and corresponding to an authentication state of the node is included in the control data packet; and based on the communication protocol and whether the first authentication information is included, forward the control data packet to the processor or drop the control data packet, wherein the filter is configured to validate the authentication information included in the control data packet prior to forwarding the control data packet to the processor and to drop the control data packet when validation fails before the control data packet reaches a service-level processing operation.

10. The server of claim 9, wherein the filter is configured to:

when the received communication protocol is a TCP protocol and the control data packet is a TCP SYN packet and the authentication information is included in the control data packet, check the authentication information;

when the check result indicates a failure, drop the control data packet; and when the check result indicates a success, forward the control data packet to the controller to generate a TCP session.

11. The server of claim 10, wherein the filter is configured to:

when the authentication information is absent from the control data packet, identify whether identification information of the node is present in the database;

when the identification information of the node is present in the database, identify whether a header is present in the control data packet;

when the header is present in the control data packet, check the header of the control data packet; and based on the header verify result, forward the control data packet to the processor to process a control request or drop the control data packet.

12. The server of claim 9, wherein the filter is configured to:

when the received communication protocol is a TCP protocol and the control data packet is not a TCP SYN packet, identify whether a header is present in the control data packet;

when the header is present in the control data packet, check the header of the control data packet; and based on the header check result, forward the control data packet to the processor to process a control request or drop the control data packet.

13. The server of claim 9, wherein the filter is configured to:

when the received communication protocol is an UDP protocol and the authentication information is included in the control data packet, check the authentication information;

when the check result indicates a failure, drop the control data packet;

when the check result indicates a success, forward the control data packet to the controller to complete authentication; and when the authentication information is included in the control data packet, drop the control data packet.

14. The server of claim 9, wherein the filter is configured to:

when the received communication protocol is not a TCP protocol or an UDP protocol, drop the control data packet.

15. The server of claim 9, wherein the processor is configured to:

receive the control data packet forwarded from the filter;

when the control data packet is a data packet for a control access request, identify whether the node or the access control application is in a state of being accessible, based on the database;

when being in an accessible state, generate a control flow and generate a data flow and channel generation information based on the database; and transfer identification information of the generated control flow, the generated data flow, and the generated channel generation information to the access control application.

16. The server of claim 9, wherein the processor is configured to:

identify a drop log of the control data packet; and determine whether to add identification information of the node to a blacklist based on the database and the drop log of the control data packet.

17. A network node, comprising:

a filter;

a communication circuit;

a memory configured to store a database; and a processor operatively connected to the filter, the communication circuit, and the memory, wherein the processor is configured to:

receive a channel data packet from an access control application of a node;

identify a communication protocol through which the channel data packet is received;

identify whether channel generation authentication information inserted into a header of the channel data packet and associated with a channel authentication state is included in the channel data packet; and based on the communication protocol and whether the channel generation authentication information is included, forward the channel data packet to the processor or drop the channel data packet, wherein the filter is configured to validate the channel generation authentication information included in the channel data packet prior to forwarding the channel data packet to the processor and to drop the channel data packet when validation fails before the channel data packet reaches a service-level processing operation.

18. The network node of claim 17, wherein the filter is configured to:

when the communication protocol is an UDP protocol and identification information of the node is included in the database, when the communication protocol is a TCP protocol, the channel data packet is a SYN packet, and the identification information of the node is included in the database, or when the communication protocol is a TCP protocol and the channel data packet is not a SYN packet, forward the channel data packet to the processor to generate a channel with the node.

19. The network node of claim 17, wherein the filter is configured to:

when the authentication information is included in the channel data packet, check the authentication information;

when the authentication result indicates a success, add identification information of the node to the database; and forward the channel data packet to the processor to transmit a result for the channel data packet to the node.

20. An operating method of an access control application installed in a node, the method comprising:

determining a communication protocol based on whether an access to an operating system transport layer through the access control application is possible;

transmitting an authentication data packet including authentication information stored in the access control application to an external server based on the determined communication protocol and requesting authentication, wherein transmitting the authentication data packet comprises generating the authentication data packet by inserting the authentication information into a payload of a transport-layer packet;

receiving an authentication result of the authentication data packet from the external server;

changing an authentication state of a control data packet based on the received authentication result and inserting authentication information corresponding to the authentication state into a header of the control data packet; and performing a control data processing request for the external server based on the control data packet whose authentication state is updated, wherein the control data packet is processed in a network environment in which a filter at a network level validates the authentication information inserted into the header of the control data packet and drops the control data packet when validation fails before forwarding the control data packet to a service-level processor.

* * * * *